(12) United States Patent
Dudar

(10) Patent No.: US 10,210,673 B2
(45) Date of Patent: Feb. 19, 2019

(54) SYSTEMS AND METHODS FOR INFERRING BAROMETRIC PRESSURE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/894,224

(22) Filed: Feb. 12, 2018

(65) Prior Publication Data

US 2018/0171902 A1 Jun. 21, 2018

Related U.S. Application Data

(63) Continuation of application No. 15/211,856, filed on Jul. 15, 2016, now Pat. No. 9,890,721.

(51) Int. Cl.
| | |
|---|---|
| *F02D 41/00* | (2006.01) |
| *G07C 5/02* | (2006.01) |
| *F02M 25/08* | (2006.01) |
| *F02M 35/104* | (2006.01) |
| *F02M 35/10* | (2006.01) |
| *B60C 23/00* | (2006.01) |
| *F02D 41/04* | (2006.01) |
| *F02D 41/22* | (2006.01) |

(52) U.S. Cl.
CPC ........... *G07C 5/02* (2013.01); *F02D 41/0045* (2013.01); *F02M 25/0818* (2013.01); *F02M 25/0836* (2013.01); *F02M 25/0854* (2013.01); *F02M 35/104* (2013.01); *F02M 35/1038* (2013.01); *B60C 23/00* (2013.01); *F02D 41/003* (2013.01); *F02D 41/042* (2013.01); *F02D 41/222* (2013.01); *F02D 2200/703* (2013.01); *F02D 2200/704* (2013.01)

(58) Field of Classification Search
CPC .... F02D 41/00; F02D 41/0045; F02D 41/003; F02D 41/042; F02D 41/222; G07C 5/02; F02M 25/0818; F02M 25/0836; F02M 25/0854; F02M 35/1038; F02M 35/104
See application file for complete search history.

(56) References Cited

U.S. PATENT DOCUMENTS

| | | | |
|---|---|---|---|
| 4,358,928 A | 11/1982 | Kotwicki | |
| 5,226,398 A | 7/1993 | Cook et al. | |
| 7,631,552 B2 | 12/2009 | Keski-Hynnila et al. | |
| 9,328,678 B2 | 5/2016 | Bohr et al. | |
| 9,708,990 B2 | 7/2017 | Dudar | |
| 9,739,239 B2 * | 8/2017 | Dudar | ................ F02M 25/0827 |
| 9,828,951 B2 * | 11/2017 | Dudar | ................ F02M 25/0809 |

(Continued)

*Primary Examiner* — Hieu T Vo
(74) *Attorney, Agent, or Firm* — Julia Voutyras; McCoy Russell LLP

(57) ABSTRACT

Methods and systems are provided for determining barometric pressure. In one example, an onboard vacuum pump is utilized to draw a vacuum at a constant flow rate across a reference orifice, and the resulting vacuum level is converted to a barometric pressure. In this way, other sensors for determining barometric pressure in a vehicle may be rationalized without the use of engine operation, and in an example where the other sensors for determining barometric pressure are not functioning as desired, barometric pressure as inferred from the onboard pump may be utilized to adjust engine operation.

20 Claims, 8 Drawing Sheets

(56) References Cited

U.S. PATENT DOCUMENTS

| | | | |
|---|---|---|---|
| 9,890,721 B2 * | 2/2018 | Dudar | F02M 25/0854 |
| 2015/0152801 A1 | 6/2015 | Racelis et al. | |
| 2016/0052499 A1 | 2/2016 | Sekiya et al. | |
| 2017/0226967 A1 | 8/2017 | Dudar et al. | |

* cited by examiner

FIG. 3A FIG. 3B FIG. 3C FIG. 3D

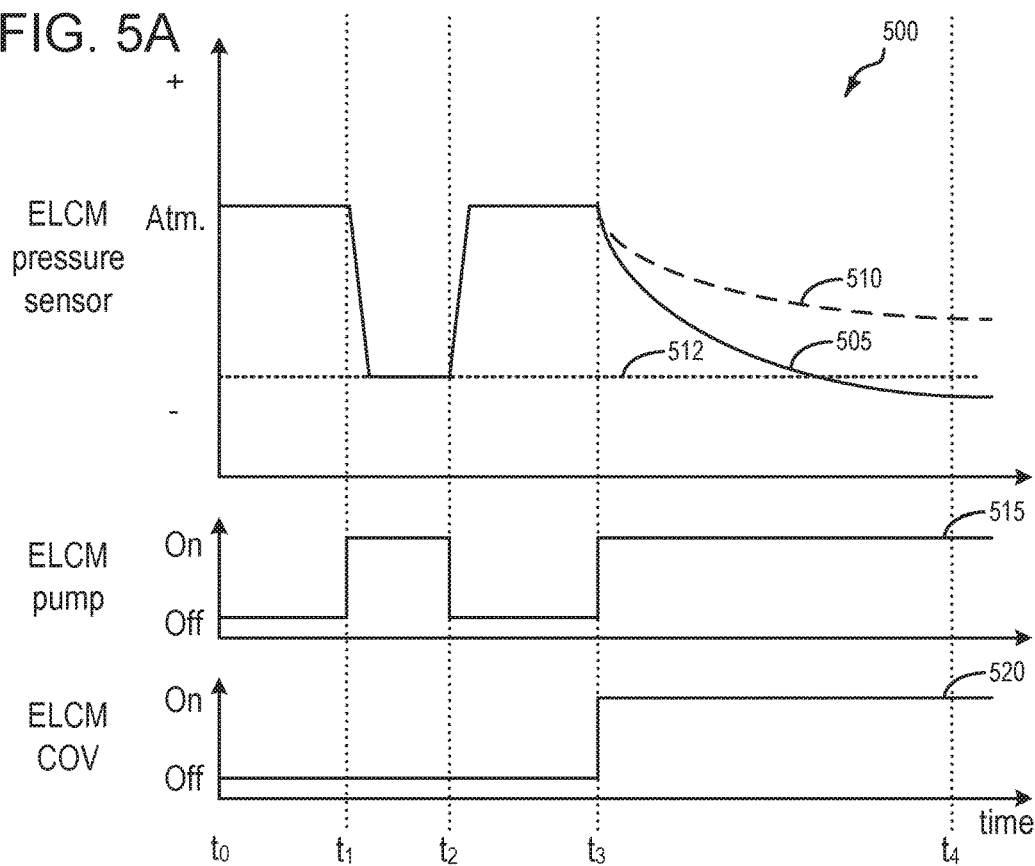
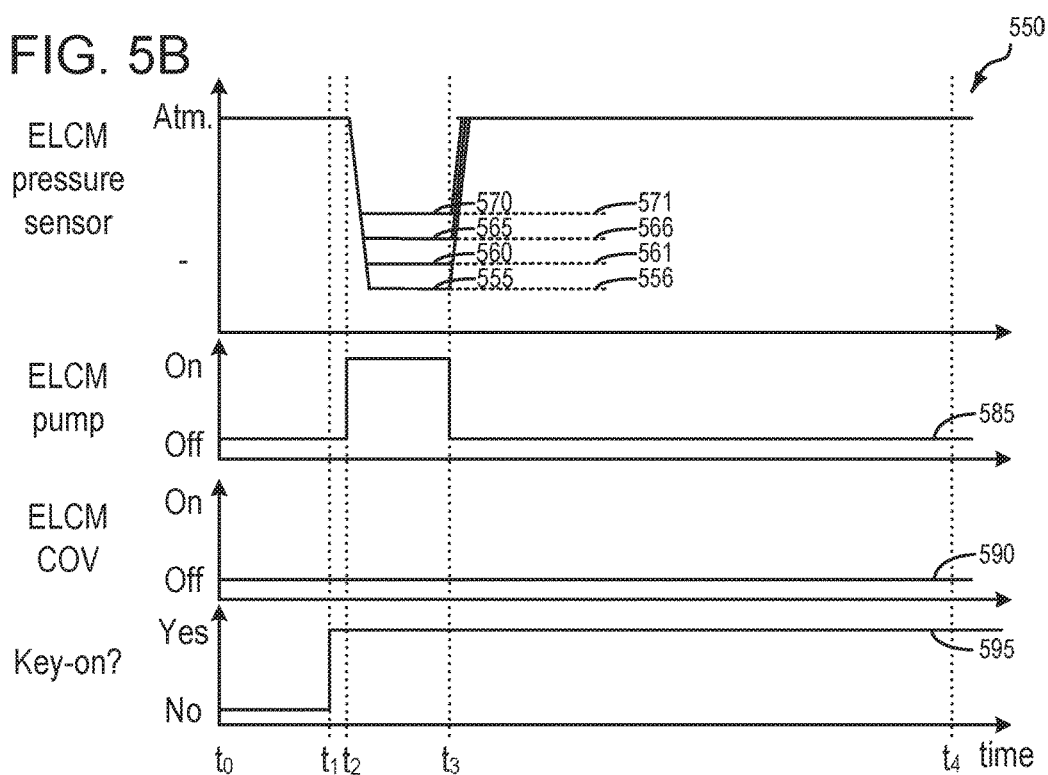

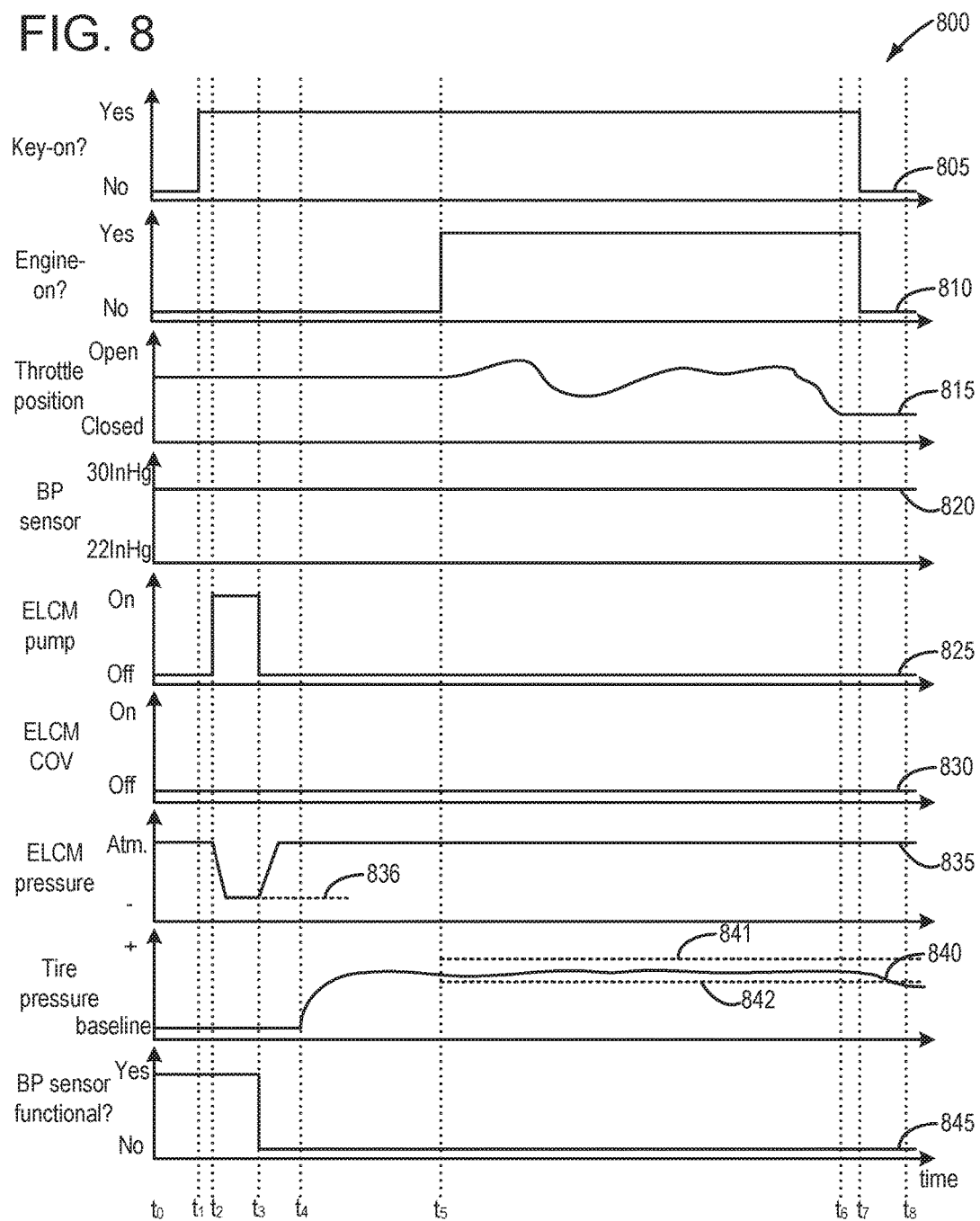

SYSTEMS AND METHODS FOR INFERRING BAROMETRIC PRESSURE

CROSS REFERENCE TO RELATED APPLICATION

The present application is a continuation of U.S. patent application Ser. No. 15/211,856, entitled "SYSTEMS AND METHODS FOR INFERRING BAROMETRIC PRESSURE," filed on Jul. 15, 2016. The entire contents of the above-referenced application are hereby incorporated by reference in its entirety for all purposes.

FIELD

The present description relates generally to methods and systems for controlling a vehicle evaporative level check module (ELCM) pump to infer barometric pressure.

BACKGROUND/SUMMARY

Barometric pressure (BP) in an engine intake of a vehicle may vary due to altitude changes of the vehicle. Thus, an accurate assessment of barometric pressure changes experienced by an engine of a vehicle may be beneficial for improved operation of the vehicle. In particular, diagnostic functions, e.g., evaporative emission control system diagnostics, and engine strategies, e.g., air/fuel ratio estimates and spark timing, may benefit from having an accurate estimate of barometric pressure. Barometric pressure is typically determined via either a dedicated BP sensor, or inferred via a manifold absolute pressure (MAP) sensor positioned in an intake of the engine. However, in a condition where the BP sensor is not functioning as desired, or if the BP inference is not correct, such a condition may have adverse effects on engine controls and other diagnostics that utilize the BP data. Accordingly, the BP sensor or surrogate MAP sensor needs to be rationalized per California Air Resources Board (CARE) regulations.

Prior art methods may utilize other engine pressure sensors to rationalize BP. For example, U.S. patent application 7,631,552 teaches a fault condition when the absolute pressure differential between intake manifold pressure and barometric pressure exceeds a calibratable maximum threshold, for a calibratable period of time and a calibratable number of occurrences and a calibratable number of drive cycles. However, the inventors have recognized potential issues with such an approach. As one example, in a case where a vehicle is not equipped with a dedicated BP sensor, but rather BP is being inferred from a MAP sensor, there may be limited options for rationality to other engine sensors. Furthermore, in some approaches a global positioning system (GPS) may be included in a vehicle to determine altitude changes. However, not all vehicles have GPS technology and there may be remote geographical areas where GPS reception is not available. As such, rationalizing BP via GPS technology may be unreliable or costly.

Thus, the inventors herein have developed systems and methods to at least partially address the above issues. In one example a method is provided, comprising delivering fuel from a fuel system to an engine propelling a vehicle; storing fuel vapors from the fuel system in an evaporative emissions control system; determining an estimate of barometric pressure as a function of an efficiency of a vacuum pump configured to evacuate or pressurize the fuel system and evaporative emissions control system; and adjusting a vehicle operating parameter responsive to the estimate.

As one example, determining an estimate of barometric pressure as a function of the efficiency of the vacuum pump includes turning on the vacuum pump and drawing a vacuum across a reference orifice of fixed diameter. The efficiency of the vacuum pump is thus a function of a vacuum level achieved by the vacuum pump when drawing the vacuum across the reference orifice of fixed diameter. In an example, efficiency of the vacuum pump decreases as barometric pressure decreases, and efficiency of the vacuum pump increases as barometric pressure increases. Barometric pressure determined as the function of the efficiency of the vacuum pump is thus correlated with barometric pressure determined from one or more sensor(s) in the vehicle, wherein it is indicated that the one or more sensors in the vehicle are not functioning as desired responsive to a lack of correlation between barometric pressure determined as the function of the efficiency of the vacuum pump and barometric pressure determined from the one or more sensor(s) in the vehicle. In this way, barometric pressure may be inferred by a pump wherein a reference vacuum is drawn across a reference orifice. By inferring barometric pressure using a pump, other barometric pressure sensor(s) in the vehicle may be rationalized, whereby engine strategies that benefit from an accurate estimate of barometric pressure may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows a schematic depiction of an evaporative level check module (ELCM) in a configuration to perform a reference check.

FIG. 3B shows a schematic depiction of an ELCM in a configuration to evacuate a fuel system and evaporative emissions system.

FIG. 3C shows a schematic depiction of an ELCM in a configuration that couples a fuel vapor canister to atmosphere.

FIG. 3D shows a schematic depiction of an ELCM in a configuration to pressurize a fuel system and evaporative emissions system.

FIG. 5A schematically shows an example timeline for conducting an evaporative emissions test diagnostic by evacuating an evaporative emissions system.

FIG. 5B schematically shows an example timeline for conducting an ELCM-based barometric pressure (BP) measurement.

FIG. 8 shows a timeline for conducting a BP rationalization procedure and for controlling vehicle operation responsive to an indication that a BP sensor is not functioning as desired.

DETAILED DESCRIPTION

Figure 1:
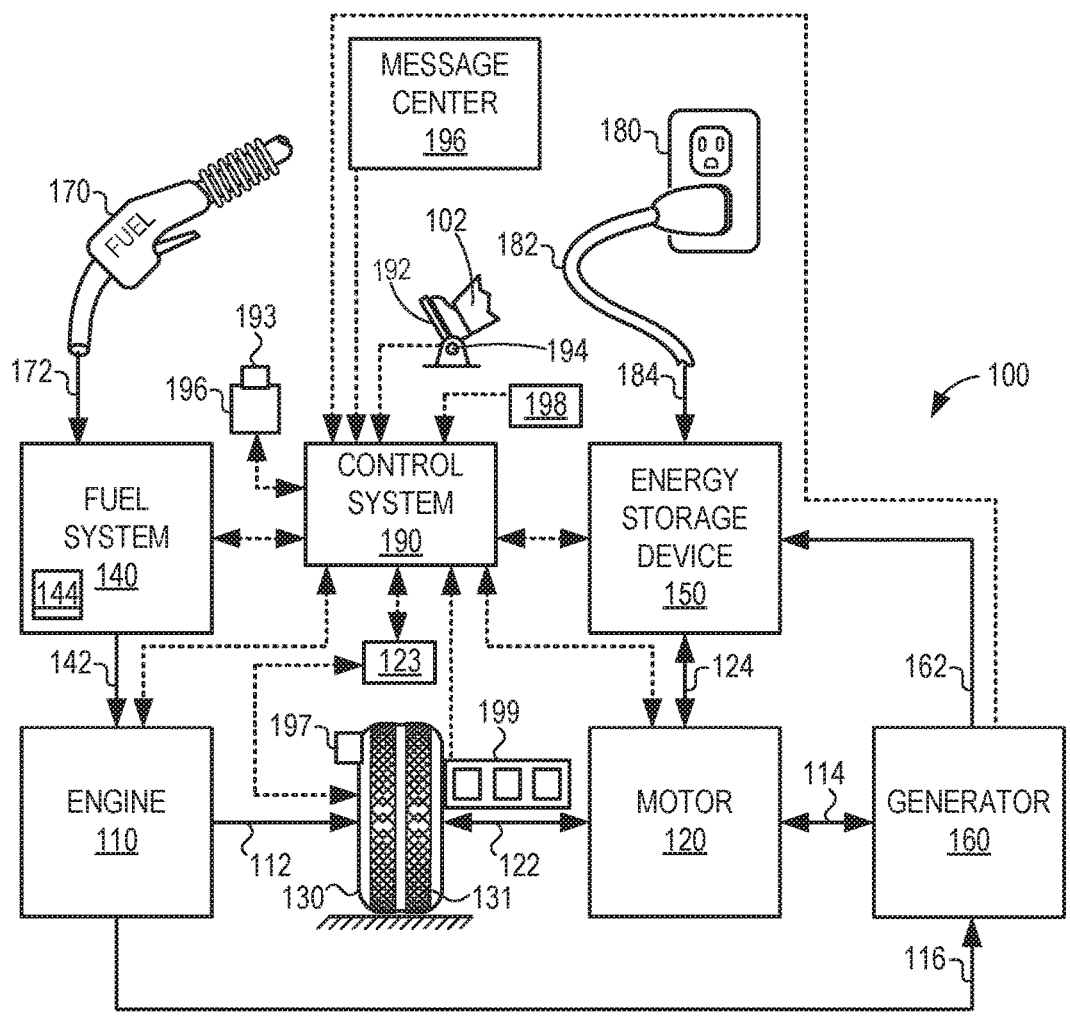
FIG. 1 schematically shows an example vehicle propulsion system.
Figure 2:
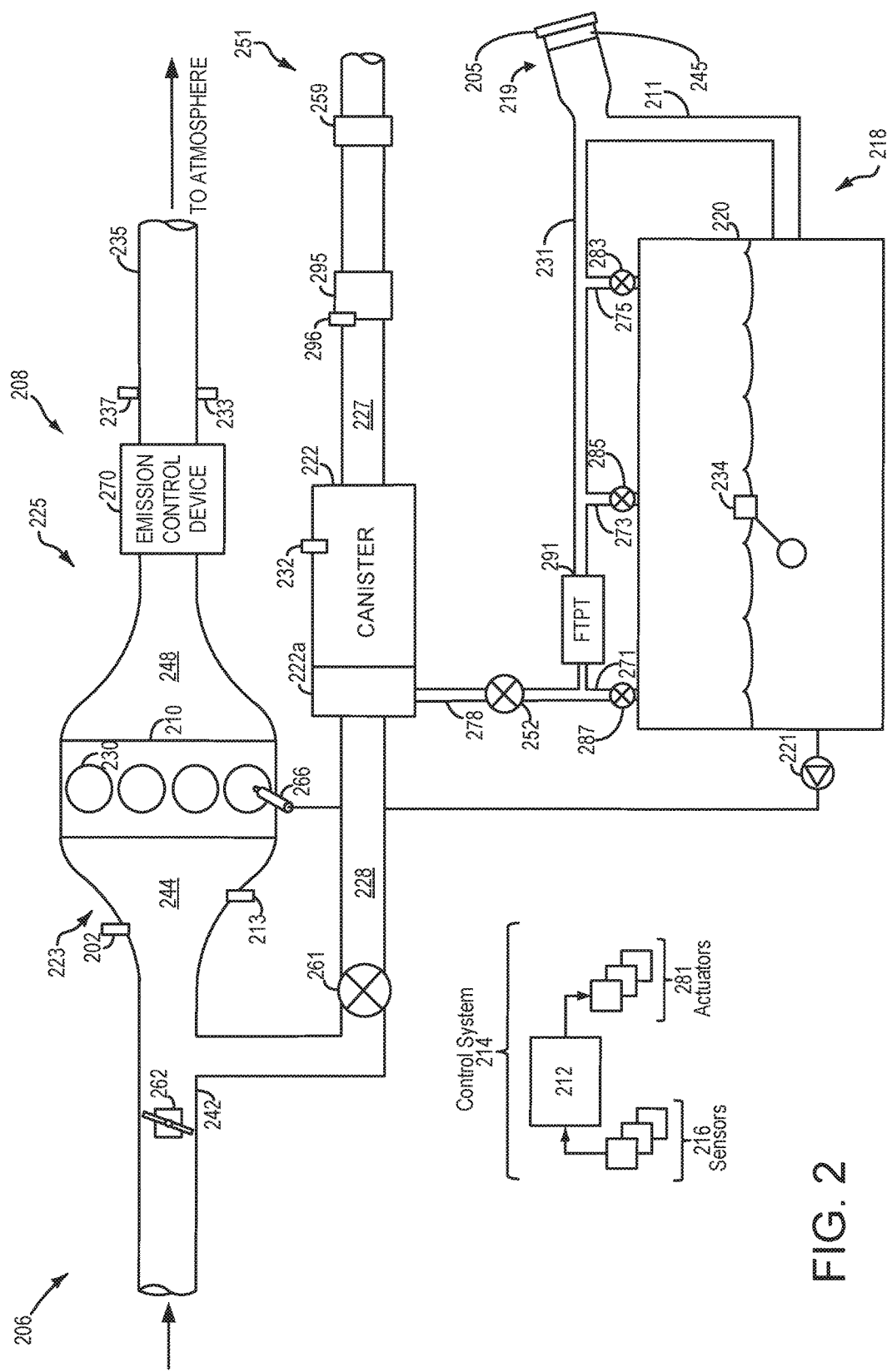
FIG. 2 schematically shows an example vehicle system with a fuel system and an evaporative emissions system.

The following description relates to systems and methods for conducting a barometric pressure (BP) rationalization procedure via the use of an evaporative level check module (ELCM). Such a rationalization procedure may be conducted on a vehicle, such as the hybrid vehicle system depicted in FIG. 1. However, while FIG. 1 depicts a hybrid vehicle system, it may be understood that the systems and methods described herein are not limited to hybrid vehicle systems. The BP rationalization procedure may be conducted using an ELCM pump (or other onboard pump) positioned in an evaporative emissions control system of the vehicle, where the ELCM pump is configured to pressurize or evacuate the evaporative emissions control system and fuel system, such as the evaporative emissions control system and fuel system coupled to an engine system as depicted in FIG. 2. The ECLM may include a reference orifice, such that when the pump is activated in a first direction and an ELCM changeover valve (COV) is off (e.g. first position), a vacuum may be drawn across the reference orifice in order to indicate a reference vacuum level, indicated by the ELCM configuration depicted in FIG. 3A. The reference vacuum level may be linearly correlated with BP, thus providing an estimate of BP. When the ELCM pump is turned on in the first direction and the ELCM COV turned on (e.g., second position), the fuel system and evaporative emissions system may be evacuated to conduct an evaporative emissions test diagnostic, as shown by the configuration depicted in FIG. 3B. When the ELCM pump is turned off and the ELCM COV is also off (e.g., first position), a fuel vapor canister may be coupled to atmosphere, as shown by the configuration depicted in FIG. 3C. When the ELCM pump is turned on in a second direction and the ELCM COV is turned on (e.g., second position), the fuel system and evaporative emissions system may be pressurized to conduct an evaporative emissions test diagnostic, as shown by the configuration depicted in FIG. 3D.

Figure 4A:
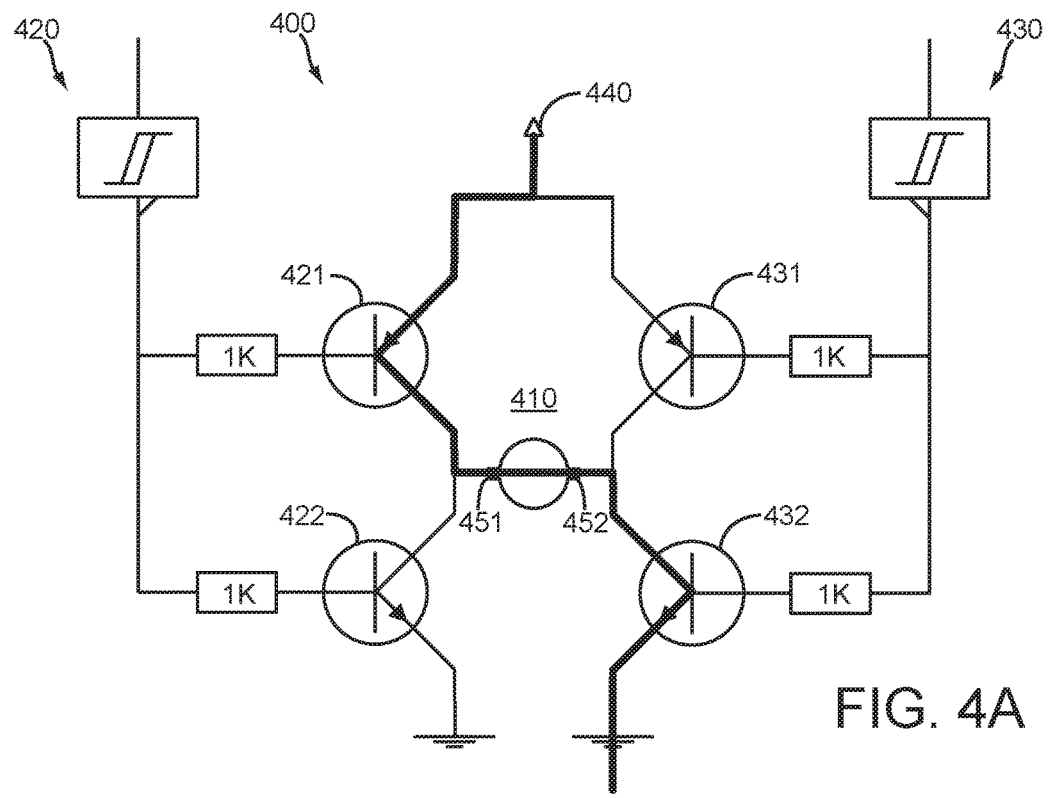
FIGS. 4A-4B show a schematic depiction of an electronic circuit configured to reverse the spin orientation of an electric motor.
Figure 4B:
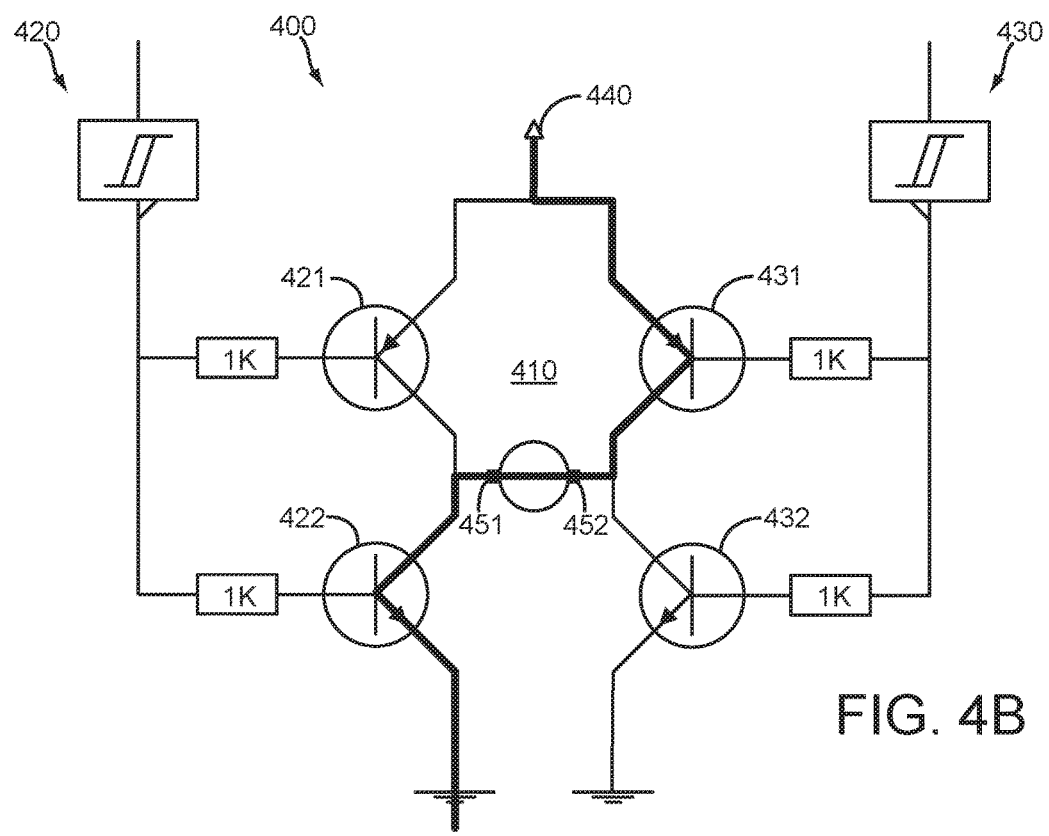

The ELCM pump may include a motor that is reversible by means of an H-bridge circuit, as shown in FIGS. 4A-4B. A typical ELCM-based evaporative emissions test diagnostic may be conducted as shown by the example timeline depicted in FIG. 5A. The ELCM may be additionally used to conduct the ELCM-based BP measurement, illustrated by the example timeline depicted in FIG. 5B. An ELCM-based BP measurement and BP rationalization procedure may be conducted according to the method illustrated in FIG. 6. Responsive to an indication that a BP sensor is not functioning as desired, vehicle operating conditions may be adjusted based on the method illustrated in FIG. 7. A timeline for conducting an ELCM-based BP measurement and BP rationalization procedure, along with adjusting vehicle operating conditions responsive to an indication that the BP sensor is not functioning as desired, is illustrated in FIG. 8.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162. During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 193 which may be manually actuated or pressed by a vehicle operator to initiate refueling. For example, as described in more detail below, in response to the vehicle operator actuating refueling button 193, a fuel tank in the vehicle may be depressurized so that refueling may be performed.

In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

One or more tire pressure monitoring sensors (TPMS) may be coupled to one or more tires of wheels in the vehicle. For example, FIG. 1 shows a tire pressure sensor 197 coupled to wheel 130 and configured to monitor a pressure in a tire 131 of wheel 130. As described in more detail below, tire pressure sensors can be used as an auxiliary source for determining a change in barometric pressure. For example, a tire pressure change may indicate an increase or decrease in vehicle altitude. Furthermore, in some examples, vehicle propulsion system 100 may include a pneumatic control unit 123. Pneumatic control unit may receive information regarding tire pressure from tire pressure sensor(s) 197, and send said tire pressure information to control system 190. Based on said tire pressure information, control system 190 may command pneumatic control unit 123 to inflate or deflate tire(s) 131. For example, responsive to an indication of a tire pressure decrease, control system 190 may command pneumatic control system unit 123 to inflate tire(s) 131. Alternatively, responsive to an indication of a tire pressure increase, control system 190 may command pneumatic control system unit 123 to deflate tire(s) 131. In both examples, pneumatic control system unit 123 may be used to inflate or deflate tires 131 to an optimal tire pressure rating for said tires, which may prolong tire life. Furthermore, it may be understood that a tire pressure increase may result from a decrease in barometric pressure, whereas a tire pressure decrease may result from an increase in barometric pressure. As such, pneumatic control system unit 123 may be used in some examples to adjust tire pressure to optimal tire pressure rating, as a function of barometric pressure changes, the barometric pressure changes in some examples a result of altitude change.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. Engine intake may further include various sensors. For example, a mass air flow (MAF) sensor 202 may be coupled to the engine intake to determine a rate of air mass flowing through the intake. Further, a barometric pressure sensor 213 may be included in the engine intake. For example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, MAF sensor 202, MAP sensor 213, and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 253, pump 292, and refueling lock 245. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 6 and 7.

Evaporative emissions test diagnostic routines may be intermittently performed by controller 212 on fuel system 218 and evaporative emissions control system 251 to confirm the presence or absence of undesired evaporative emissions. As such, evaporative emissions test diagnostic routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions test diagnostic routines may be performed while the engine is running by operating a vacuum pump and/or using engine intake manifold vacuum. Evaporative emissions test diagnostics may be performed by an evaporative level check module (ELCM) 295 communicatively coupled to controller 212. ELCM 295 may be coupled in vent 227, between canister 222 and the atmosphere. ELCM 295 may include a vacuum pump for applying negative pressure to the fuel system when administering a evaporative emissions test. In some embodiments, the vacuum pump may be configured to be reversible. In other words, the vacuum pump may be configured to apply either a negative pressure or a positive pressure on the evaporative emissions system 251 and fuel system 218. ELCM 295 may further include a reference orifice and a pressure sensor 296. A reference check may thus be performed whereby a vacuum may be drawn across the reference orifice, where the resulting vacuum level comprises a vacuum level indicative of an absence of undesired evaporative emissions. For example, following the reference check, the fuel system 218 and evaporative emissions system 251 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level.

Figures 3A, 3B, 3C, 3D:
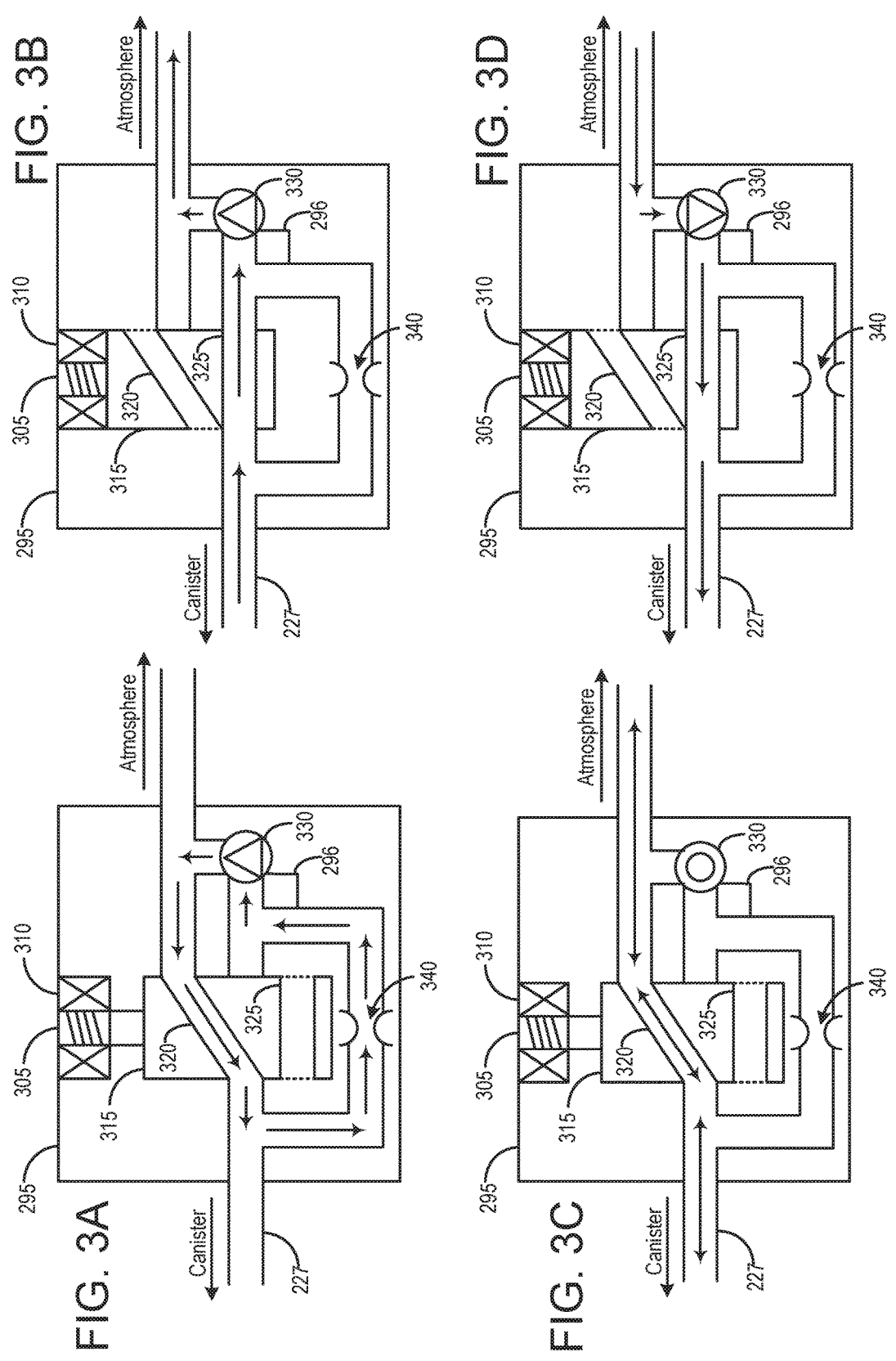

FIGS. 3A-3D show a schematic depiction of an example ELCM 295 in various conditions in accordance with the present disclosure. As shown in FIG. 2, ELCM 295 may be located along vent 227 between canister 222 and atmosphere. ELCM 295 includes a changeover valve (COV) 315, a pump 330, and a pressure sensor 296. Pump 330 may be a reversible pump, for example, a vane pump. COV 315 may be moveable between a first a second position. In the first position, as shown in FIGS. 3A and 3C, air may flow through ELCM 295 via first flow path 320. In the second position, as shown in FIGS. 3B and 3D, air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold for undesired evaporative emissions to be tested, for example, 0.02". In either the first or second position, pressure sensor 296 may generate a pressure signal reflecting the pressure within ELCM 295. Operation of pump 330 and solenoid 310 may be controlled via signals received from controller 212. As will be discussed in further detail below, in addition to being utilized in order to conduct an evaporative emissions test diagnostic procedure, the ELCM may be used to infer barometric pressure (BP). Briefly, the pump 330 may be activated to draw a vacuum across the reference orifice 340. The level of vacuum achieved may be linearly correlated with BP. In other words, the ELCM pump may be more efficient at lower altitudes and less efficient at higher altitudes. As such, a BP may be inferred based on a vacuum level indicated during drawing a vacuum across the reference orifice 340.

As shown in FIG. 3A, COV 315 is in the first position, and pump 330 is activated in a first direction. Air flow through ELCM 295 in this configuration is represented by arrows. In this configuration, pump 330 may draw a vacuum on reference orifice 340, and pressure sensor 296 may record the vacuum level within ELCM 295. This reference check vacuum level reading may then become the threshold for the presence or absence of undesired evaporative emissions in a subsequent evaporative emissions test diagnostic. Furthermore, discussed above and which will be discussed in further detail below, an ELCM-based BP measurement may be conducted based on the reference vacuum level, where the reference vacuum level may be used to infer a BP, and where the inferred BP may be used to rationalize a BP sensor (e.g., 213). For example, efficiency of the pump (e.g., onboard vacuum pump) is a function of the vacuum level achieved by the vacuum pump when drawing the vacuum across the reference orifice of fixed diameter. As such, efficiency of the vacuum pump decreases as barometric pressure decreases, whereas efficiency of the vacuum pump increases as barometric pressure increases. In other words, the vacuum level reached during activating the onboard vacuum pump to draw the vacuum across the reference orifice is linearly correlated with barometric pressure. As such, a method is described below (FIG. 6) describing correlating barometric pressure determined as the function of the efficiency of the vacuum pump with barometric pressure determined from one or more sensor(s) in the vehicle. For example, the method may include indicating the one or more sensor(s) in the vehicle are not functioning as desired responsive to a lack of correlation between barometric pressure determined as the function of the efficiency of the vacuum pump and barometric pressure determined from the one or more sensor(s) in the vehicle. In some examples, the one or more sensor(s) in the vehicle may include a manifold absolute pressure sensor coupled to an air intake manifold of the engine. As such, an estimate of barometric pressure may be determined without operation of the vehicle engine, via the use of an electric onboard vacuum pump.

As shown in FIG. 3B, COV 315 is in the second position, and pump 330 is activated in the first direction. This configuration allows pump 330 to draw a vacuum on fuel system 218 and evaporative emissions system 251. In examples where fuel system 218 includes FTIV 252, FTIV 252 may be opened to allow pump 330 to draw a vacuum on fuel tank 220. Air flow through ELCM 295 in this configuration is represented by arrows. In this configuration, as pump 330 pulls a vacuum on fuel system 218, the absence of undesired evaporative emissions in the system should allow for the vacuum level in ELCM 295 to reach or exceed the previously determined reference vacuum threshold. In the presence of undesired evaporative emissions larger than the reference orifice, the pump will not pull down to the reference check vacuum level.

As shown in FIG. 3C, COV 315 is in the first position, and pump 330 is de-activated. This configuration allows for air to freely flow between atmosphere and the canister. This configuration may be used during a canister purging operation, for example, and may additionally be used during vehicle operation when a purging operation is not being conducted, and when the vehicle is not in operation.

As shown in FIG. 3D, COV 315 is in the second position, and pump 330 is activated in a second direction, opposite from the first direction. In this configuration, pump 330 may pull air from atmosphere into fuel system 218 and evaporative emission system 251. In a configuration where FTIV 252 is open and CPV 261 is closed, air drawn by pump 330 may promote desorption of fuel vapor from canister 222, and further direct the desorbed fuel vapor into fuel tank 220. In this way, fuel vapor may be purged from the canister to the fuel tank, thereby decreasing the potential for bleed emissions.

In summary, drawing a vacuum across the reference orifice of fixed diameter includes configuring the changeover valve coupled to the vacuum pump in a first position (an OFF configuration), and pressurizing or evacuating the vehicle fuel system and evaporative emissions control system includes configuring the changeover valve in a second position (on ON configuration). FIGS. 4A and 4B show an example circuit 400 that may be used for reversing pump motor of ELCM 295. Circuit 400 schematically depicts an H-Bridge circuit that may be used to run a motor 410 in a first (forward) direction and alternately in a second (reverse) direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are activated, while transistors 422 and 431 are off. In this confirmation, the left lead 451 of motor 410 is connected to power source 440, and the right lead 452 of motor 410 is connected to ground. In this way, motor 400 may run in a forward direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. During one or more of or each of the forward engine rotation operations, fuel vapors may also be purged to the engine with and/or without engine combustion occurring.

In FIG. 4B, transistors 422 and 431 are activated, while transistors 421 and 432 are off. In this confirmation, the right lead 452 of motor 410 is connected to power source 440, and the left lead 451 of motor 410 is connected to ground. In this way, motor 400 may run in a reverse direction.

FIG. 5 depicts an example timeline 500 for conducting an evaporative emissions test diagnostic utilizing an evaporative level check module (ELCM) to evacuate a vehicle evaporative emissions control system in order to conduct an evaporative emissions test diagnostic. While not explicitly illustrated, it may be understood that, if included, a fuel tank isolation valve (FTIV) (e.g., 252) is closed to isolate the fuel system from the evaporative emission control system. However, in some examples, the FTIV may be open, thus coupling the fuel system to the evaporative emissions control system, whereby the evaporative emissions test diagnostic may be conducted on the fuel system and evaporative emissions control system. In this example timeline 500, for illustrative purposes, it may be understood that, if included, the FTIV is closed. Timeline 500 includes plot 505, indicating pressure as monitored, for example, by an ELCM pressure sensor (e.g., 296), over time. Line 512 represents a threshold vacuum level (reference vacuum level) indicating the absence of undesired evaporative emissions, discussed in further detail below. Timeline 500 further includes plot 515, indicating an on or off state of the ELCM pump (e.g., 330), over time. Timeline 500 further includes plot 520, indicating whether an ELCM changeover valve (COV) (e.g., 315) is in an on (e.g., second position) or off (e.g., first position) state, over time.

At time t0, pressure as monitored by the ELCM pressure sensor (e.g., 296) is at atmospheric pressure, illustrated by plot 505, as the COV is off, illustrated by plot 520. Such a configuration is described above with regard to FIG. 3C. At time t1, the ELCM pump is activated with the ELCM COV off. In this example timeline, it may be understood that the ELCM pump is activated in a first direction, as depicted above with regard to FIG. 3A. With the ELCM pump activated and the COV off, a vacuum may be drawn on a reference orifice (e.g., 340) within the ELCM. Accordingly, between time t1 and t2, pressure as monitored by the ELCM pressure sensor becomes negative with respect to atmospheric pressure. Furthermore, between time t1 and t2, pressure as monitored by the ELCM pressure sensor is indicated to plateau. The negative pressure reached between time t1 and t2 thus sets a reference vacuum level, represented by line 512. The reference vacuum level represents a threshold vacuum level, based on a diameter of the reference orifice. As discussed above and which will be discussed in further detail below, the reference vacuum level may change as a function of altitude.

At time t2, the ELCM pump is turned off, indicated by plot 515. The ELCM COV is maintained off, indicated by plot 520. Such a configuration is depicted above with regard to FIG. 3C. With the ELCM pump off and the COV off, pressure as monitored by the ELCM pressure sensor returns to atmospheric pressure between time t2 and t3.

At time t3, with the reference vacuum level established, the ELCM COV is switched from off to an on configuration, thus changing the COV from the first position to a second position. Furthermore, the ELCM pump is again activated. Such a configuration is illustrated above with regard to FIG. 3B. With the ELCM pump activated and the COV on, a vacuum is drawn on the evaporative emissions control system. Accordingly, between time t3 and t4, pressure as monitored by the ELCM pressure sensor becomes negative with respect to atmospheric pressure, indicated by plot 505. Furthermore, pressure between time t3 and t4 reaches the reference vacuum level threshold, represented by plot 512. As such, it may be understood that the evaporative emissions control system is free from undesired evaporative emissions. As an example, plot 510 is depicted by a dashed line in order to illustrate a condition where vacuum in the evaporative emissions control system did not reach the reference vacuum level threshold. In such a condition, it may be understood that the evaporative emissions control system is not free from undesired evaporative emissions.

As discussed above, the reference vacuum level threshold may vary as a function of altitude, as an ELCM pump may be less efficient at altitude due to the atmospheric pressure being lower. For example, an ELCM pump may be able to achieve a maximum vacuum level (e.g., $-13$ $InH_2O$), at sea level, and a substantially lower vacuum level at altitude (e.g., $-9$ $InH_2O$ at 8500 feet). Due to the relationship between ELCM pump efficiency and altitude, the ELCM pump may be utilized in order to infer barometric pressure. By inferring barometric pressure via the use of the ELCM pump, other barometric pressure sensors, for example a dedicated barometric pressure sensor or a manifold absolute pressure (MAP) sensor (e.g., 213), may be rationalized based on vacuum level attained by the ELCM pump.

Turning now to FIG. 5B, an example timeline 550 for conducting a measurement of barometric pressure utilizing an ELCM pump, is shown. Timeline 550 includes plots 555, 560, 565, and 570, illustrating pressure as monitored by an ELCM pressure sensor (e.g., 296) at various altitudes, over time. Lines 556, 561, 566, and 571 represent barometric pressure(s), determined based on the pressure(s) monitored by the ELCM pressure sensor, respectively. Timeline 550 further includes plot 585, indicating whether an ELCM pump (e.g., 330) is on or off, over time. Timeline 550 further includes plot 590, indicating whether an ELCM change over valve (COV) (e.g., 315), is in an on or off configuration, over time. Timeline 550 further includes plot 595, indicating whether a vehicle key-on event is indicated, over time.

At time t0, the ELCM pump is off, indicated by plot 585, and the ELCM COV is in an off configuration, indicated by plot 590. Such a condition is depicted above with regard to FIG. 3C. With the COV in an off configuration and the ELCM pump off, the ELCM pressure sensor indicates pressure to be at atmospheric pressure.

At time t1, a key-on event is indicated. While not explicitly illustrated, it may be understood that the key-on event may comprise a vehicle-on event in electric-only mode. However, in another example the key-on event may comprise a vehicle-on event where the engine is operating (e.g., rotating and combusting fuel). A key-on event may include a vehicle operator manually turning a key in a vehicle ignition, depressing a button on the dash in order to activate the vehicle, or remotely starting the vehicle via key fob or other smart device, for example. At time t2, the ECLM pump is activated, with the ELCM COV maintained in an off configuration. Such a condition is depicted above with regard to FIG. 3A. With the ELCM pump activated and the ELCM COV maintained in an off configuration, vacuum may be drawn on an ECLM reference orifice (e.g., 340). Accordingly, between time t2 and t3, pressure as monitored by the ELCM pressure sensor (e.g., 296) becomes negative with respect to atmospheric pressure. For illustrative purposes, various negative pressure levels are shown, however it may be understood that, for a single ELCM-based barometric pressure measurement, only one negative pressure plateau may be reached. The depiction of various negative pressure plateau levels is meant to illustrate a number of different ELCM-based barometric pressure measurements conducted at different altitudes, in order to illustrate the point that different negative pressure plateaus may be reached as a function of altitude. For example, pressure indicated by plot 555 may comprise $-13.5$ $InH_2O$. Such a pressure level may correspond to a barometric pressure of 29 InHg, represented by line 556. In another example, pressure indicated by plot 560 may comprise $-12.5$ $InH_2O$. Such a pressure level may correspond to a barometric pressure of 27 InHg, represented by line 561. In another example, pressure indicated by plot 565 may comprise −11.5 InH$_2$O. Such a pressure level may correspond to a barometric pressure of 25 InHg, represented by line 566. In still another example, pressure indicated by plot 570 may comprise −10.5 InH$_2$O. Such a pressure level may correspond to a barometric pressure of 23 InHg, represented by line 571. It may be understood that the example pressures levels as indicated by the ELCM pressure sensor and corresponding barometric pressures are meant to be illustrative, and in no way limiting. Thus, it may be understood that pressure levels as monitored by the ELCM pressure sensor during drawing a vacuum across an ELCM reference orifice may be linearly correlated with barometric pressure, such that barometric pressure measurements may be accurately inferred based on ELCM reference vacuum levels.

Responsive to a reference vacuum level (pressure plateau) being reached, and an inference of barometric pressure being determined based on the reference vacuum level, the ELCM pump may be commanded off, indicated by plot 585. The COV may be maintained in the off configuration, indicated by plot 590. Accordingly, with the ECLM pump off and the COV in an off configuration, pressure between time t3 and t4 returns to atmospheric pressure, indicated by the various pressures depicted by plots 555, 560, 565, and 570.

Figure 6:
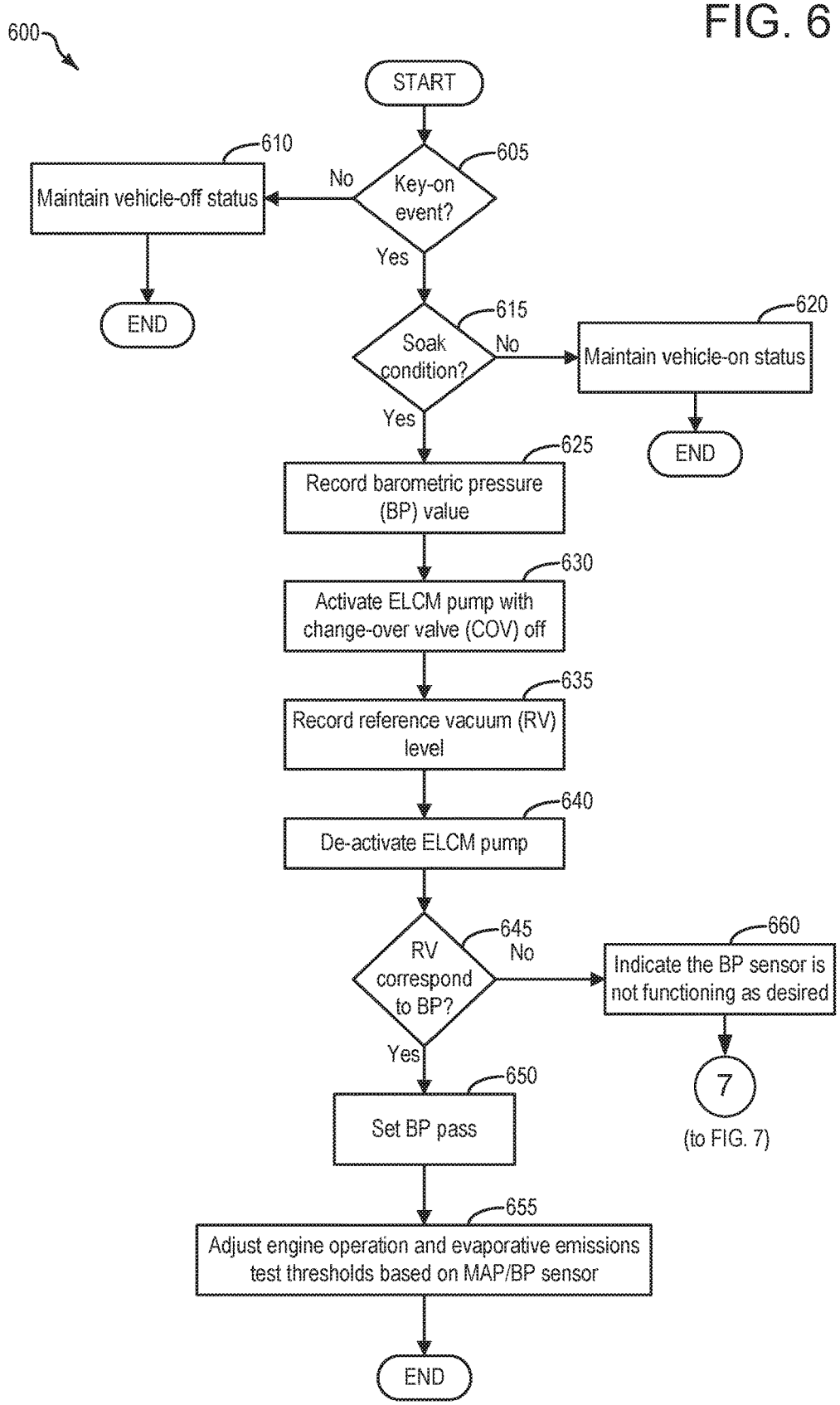
FIG. 6 shows a high level flow chart for conducting an ELCM-based BP measurement and a BP sensor rationalization procedure.

Turning now to FIG. 6, a high level flow chart for an example method 600 for conducting an ELCM-based barometric pressure (BP) measurement to rationalize another BP sensor, is shown. More specifically, method 600 may be used in order to infer barometric pressure based on ELCM pump efficiency, wherein the inferred barometric pressure may be compared to barometric pressure indicated by another barometric pressure sensor, such as a manifold absolute pressure (MAP) sensor (e.g., 213). If BP inferred based on the ELCM-based BP measurement correlates with BP indicated by another BP sensor (e.g., MAP sensor), then it may be indicated that the BP sensor is functioning as desired. However, if the BP inferred based on the ELCM-based BP measurement does not correlate with BP indicated by the other sensor (e.g., MAP sensor), it may be indicated that the other BP sensor is not functioning as desired.

In other words, method 600 may include indicating barometric pressure via one or more barometric pressure sensor(s) (e.g., MAP sensor) positioned in a vehicle, activating a vacuum pump onboard the vehicle to draw a vacuum across a reference orifice of fixed diameter, determining barometric pressure as a function of a vacuum level reached during activating the onboard vacuum pump, and indicating the one or more vehicle barometric pressure sensor(s) are not functioning as desired responsive to barometric pressure determined as the function of the vacuum level reached during activating the onboard pump not correlating with barometric pressure indicated via the one or more barometric pressure sensor(s). In an example, responsive to an indication that the one or more vehicle barometric pressure sensor(s) are functioning as desired, method 600 may include adjusting vehicle operating parameters based on barometric pressure indicated from the one or more vehicle barometric pressure sensor(s) during vehicle operation. In another example, responsive to an indication that the one or more vehicle barometric pressure sensor(s) are not functioning as desired, method 600 may proceed to method 700 depicted in FIG. 7, wherein vehicle operating parameters may be adjusted based on the barometric pressure determined as the function of the vacuum level reached during activating the onboard vacuum pump.

Method 600 will be described with reference to the systems described herein and shown in FIGS. 1-4B, though it should be understood that similar methods may be applied to other systems without departing from the scope of this disclosure. Method 600 may be carried out by a controller, such as controller 12 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions control system actuators, such as canister purge valve (CPV) (e.g., 261), fuel tank isolation valve (FTIV) (e.g., 252), ELCM pump (e.g., 330), and ELCM changeover valve (COV) (e.g., 315), etc., according to the method below.

Method 600 begins at 605 and may include indicating whether a key-on event is indicated. For example, as discussed above, a key-on event may include a vehicle operator manually turning a key in a vehicle ignition, depressing a button on the dash in order to activate the vehicle, remotely starting the vehicle via key fob or other smart device, etc. If, at 605, a key-on event is not indicated, method 600 may proceed to 610. At 610, method 600 may include maintaining vehicle-off status. For example, the vehicle engine and/or power from an onboard energy storage device may be maintained off, and fuel system and evaporative emissions control system actuators may be maintained in their current status. More specifically, the CPV, FTIV, ELCM pump, and ELCM COV may be maintained in their current status. Method 600 may then end.

Returning to 605, if a key-on event is indicated, method 600 may proceed to 615. At 615, method 600 may include indicating whether the key-on event comprises a soak condition. In other words, it may be determined if the key-on event occurred without the engine being activated. For example, it may be determined that the key-on event comprises an event where the vehicle is activated in an electric-only mode. As discussed above, a BP sensor measurement based on a BP sensor (e.g., 213) positioned in an intake manifold 244 of the engine may rely on part throttle or wide open throttle (WOT) conditions in order to accurately determine BP. Accordingly, if the key-on event includes engine activation, conditions may be such that it is not practical to determine BP. In other words, throttle position at a key-on event and with the engine activation may be such that accurate BP measurement is not feasible. Accordingly, at 615, if a soak condition (e.g., engine-off condition) is not indicated, method 600 may proceed to 620. At 620, method 600 may include maintaining vehicle-on status, and not recording BP at the key-on event. Maintaining vehicle-on status at 620 may include maintaining an air intake throttle (e.g., 262) in its current position, maintaining engine operational status, and maintaining fuel system and evaporative emissions system actuators such as the CPV, FTIV, ELCM COV, and ELCM pump in their respective status. Method 600 may then end.

Returning to 615, if a soak condition is indicated, method 600 may proceed to 625. At 625, method 600 may include recording a barometric pressure value based on the barometric pressure sensor (e.g., 213). More specifically, because it is indicated that the vehicle was activated without engine-operation (e.g. electric-only mode), the air intake throttle (e.g., 262) may be commanded open or maintained open, such that an accurate indication of BP may be determined. Furthermore, without engine operation, accurate BP measurement may be determined by the BP sensor without the need for compensating for intake air flow. Thus, at 625, BP may be determined via the BP sensor (e.g., 213), and the value may be stored at the controller, for example.

Proceeding to 630, method 600 may include activating the ELCM pump with the ELCM COV in an off configuration. As discussed above with regard to FIG. 3A, and FIG. 5B, activating the ELCM pump with the COV in an off (e.g., first position) configuration, ELCM pump (e.g., 330) may draw vacuum on an ELCM reference orifice (e.g., 340). The resulting vacuum level (e.g., negative with respect to atmospheric pressure) may be indicated by an ELCM pressure sensor (e.g., 296). Responsive to the vacuum level reaching a plateau, method 600 may proceed to 635, and may include recording the reference vacuum level. In other words, the maximum level of vacuum that can be drawn across the reference orifice, may comprise the reference vacuum level. As discussed above, the reference vacuum level may be dependent on altitude, as the ELCM pump efficiency may decrease as a function of higher altitude with respect to sea level. The reference vacuum level recorded at 635 may be stored at the controller, for example.

Proceeding to 640, method 600 may include de-activating the ELCM pump. In other words, the ELCM pump may be stopped from drawing a vacuum across the reference orifice, and returned to a default, ELCM pump-off state. With the ELCM pump deactivated, pressure as monitored by the ELCM pressure sensor may return to atmospheric pressure. While not explicitly shown, it may be understood that the COV may be maintained in the off state (e.g., first position). By deactivating the ELCM pump and maintaining the COV in the off state, ELCM configuration may comprise that depicted in FIG. 3C.

Continuing to 645, method 600 may include indicating whether the reference vacuum level determined at step 635 corresponds to the BP value determined at step 625. For example, as described above, a linear correlation may exist between reference vacuum level and barometric pressure. As such, at 645, method 600 may include the controller converting reference vacuum level as determined by the ELCM pressure sensor into inferred BP. For example, as discussed above, a reference vacuum level of −13.5 InH$_2$O may correspond to a BP of 29 InHg, a reference vacuum level of −12.5 InH$_2$O may correspond to a barometric pressure of 27 InHg, a reference vacuum level of −11.5 InH$_2$O may correspond to a barometric pressure of 25 InHg, and a reference vacuum level of −10.5 InH$_2$O may correspond to a barometric pressure of 23 InHg. Such examples are only illustrative, and reference vacuum levels and their corresponding barometric pressures may vary as a function of reference orifice (e.g., 340) diameter, ELCM pump strength, etc. Importantly, it may be understood that a linear relationship may exist between reference vacuum level and BP for a given ELCM pump and a given reference orifice diameter. As such, reference vacuum levels and their corresponding BP may be included in a lookup table stored at the controller, such that reference vacuum level may be converted to an inferred BP by the controller at 645. Accordingly, it may thus be determined at 645 whether the reference vacuum level corresponds to the BP value recorded at 625 from the barometric pressure sensor (e.g., 213). In other words, it may be determined whether the inferred BP from the ELCM-based BP measurement correlates with the BP measurement determined from the BP sensor (e.g., 213). Whether the BP inferred from the ELCM-based BP measurement correlates with the BP measurement determined from the BP sensor may be based on a predetermined degree of closeness between the two values. For example, the ELCM-based BP measurement may be indicated to correlate with the BP measurement if the measurements are within 0.1 InHg, 0.5 In Hg, or 1 InHg of each other. However, such examples are meant to be illustrative and in no way limiting. For example, the ELCM-based BP measurement may be indicated to correlate with the BP measurement if the measurements are within less than 0.1 InHg of each other, or greater than 1.0 InHg of each other but less than another predetermined value of InHg.

If, at 645, it is indicated that the reference vacuum level (ELCM-based BP measurement) corresponds to the BP measurement (e.g., BP sensor 213), method 600 may proceed to 650. At 650, method 600 may include indicating a passing result of the BP rationalization test. In other words, it may be indicated that the BP sensor (e.g., 213) is functioning as desired. In some examples, the passing result may be stored at the controller.

Proceeding to 655, method 600 may include adjusting engine operation and evaporative emissions test thresholds based on BP values determined by the BP sensor for the duration of the vehicle drive cycle. For example, because the BP sensor (e.g., 213) was determined to be functioning as desired, BP measurements based on the BP sensor may be continually updated during the ensuing drive cycle, and engine operation adjusted accordingly as a function of the BP measurements, provided that the engine is activated/operated during the ensuing drive cycle. More specifically, air/fuel ratio control and spark timing may be adjusted responsive to BP as indicated by the barometric pressure sensor (e.g., 213). Furthermore in the event of any evaporative emissions test diagnostic procedures that may occur during the ensuing drive cycle, thresholds corresponding to the absence or presence of undesired evaporative emissions may be set as a function of the BP measurements. For example, some evaporative emissions test diagnostic procedures may occur during engine-on conditions, where engine intake manifold vacuum is utilized in order to evacuate the vehicle fuel system (e.g., 218) and/or evaporative emissions control system (e.g., 251). In such an example, the CPV may be commanded open, the FTIV may be commanded open or in some examples maintained closed, and the ELCM COV may be turned on (e.g., switched to the second position). Pressure in the fuel system and/or evaporative emissions control system may be monitored by a fuel tank pressure transducer (e.g., 291) or the ELCM pressure sensor (e.g., 296). Responsive to a threshold vacuum (e.g. negative with respect to atmospheric pressure) being reached, the fuel system and/or evaporative emissions control system may be sealed from engine intake by commanding closed the CPV, and pressure bleed-up may be monitored. A pressure bleed-up rate greater than a predetermined threshold bleed-up rate, or a pressure increase to a predetermined pressure threshold may within a predetermined time duration may be indicative of the presence of undesired evaporative emissions. In such an example test diagnostic, if the BP sensor (e.g., 213) has been determined via method 600 to be functioning as desired, threshold pressure bleed-up rate(s) and/or predetermined pressure threshold(s) may be adjusted based on BP as indicated by the BP sensor. Specifically, responsive to an increase in BP (decrease in altitude), in some examples a threshold for indicating an absence of undesired evaporative emissions may be increased to compensate for the indicated increase in BP, and vice versa. Furthermore, in some examples, if it is indicated that BP is changing rapidly and an evaporative emissions test diagnostic is being conducted, the diagnostic may be aborted if the BP change is greater than a predetermined BP change threshold.

Returning to 645, if it is indicated that the reference vacuum level (ELCM-based BP measurement) does not correspond to the BP measurement as determined by the BP sensor (e.g., 213), method 600 may proceed to 660. At 660, method 600 may include indicating that the BP sensor is not functioning as desired. The indication that the BP sensor is not functioning as desired may be stored at the controller, for example. In some examples, a malfunction indicator light (MIL) may be illuminated on a dashboard of the vehicle in order to alert the vehicle operator of the need to service the vehicle. As the BP sensor is not functioning as desired, method 600 may proceed to FIG. 7, where method 700 may be utilized to adjust engine operation and evaporative emissions test thresholds responsive to the indication that the BP sensor is not functioning as desired.

Figure 7:
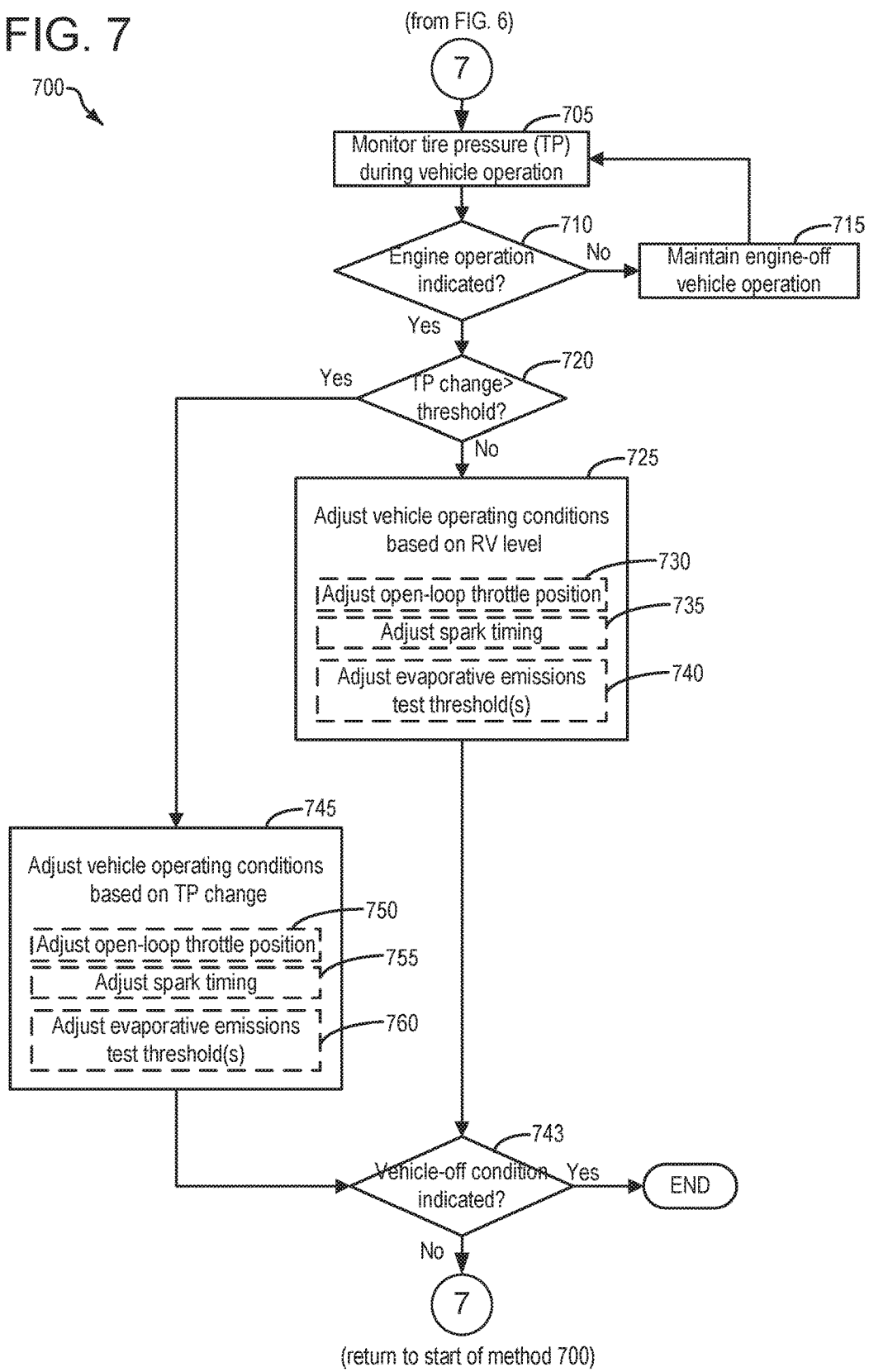
FIG. 7 shows a high level flow chart for controlling vehicle operation responsive to an indication that a BP sensor is not functioning as desired.

Turning now to FIG. 7, a high level flow chart for an example method 700 for controlling vehicle operation responsive to an indication that a BP sensor (e.g., 213) is not functioning as desired, is shown. More specifically, method 700 may continue from method 600, and may include monitoring tire pressure during vehicle operation, and, responsive to engine operation and a change in tire pressure greater than a predetermined threshold, adjusting vehicle operating conditions based on the indicated tire pressure change.

For example, one or more tire pressure monitoring sensor(s) may be coupled to one or more tires of wheels in the vehicle. Responsive to a lack of correlation between barometric pressure indicated as a function of vacuum level during drawing vacuum across a reference orifice and barometric pressure indicated via a barometric pressure sensor, as indicated via method 600 depicted above, method 700 may be used to indicated a change in barometric pressure during vehicle operating conditions responsive to a tire pressure change greater than a predetermined tire pressure change threshold. In one example, method 700 may include adjusting vehicle operating parameters as a function of barometric pressure indicated as the function of vacuum level reached during drawing the vacuum across the reference orifice responsive to lack of correlation between barometric pressure indicated via the barometric pressure sensor and barometric pressure indicated as the function of vacuum level reached during drawing vacuum across the reference orifice, and further responsive to tire pressure change less than the predetermined tire pressure change threshold. In another example, method 700 may include adjusting vehicle operating parameters as a function of tire pressure responsive to lack of correlation between barometric pressure indicated via the barometric pressure sensor and barometric pressure indicated as the function of vacuum level reached during drawing vacuum across the reference orifice, and further responsive to tire pressure change greater than the predetermined tire pressure change threshold. In the examples described above, and which will be described in further detail below, adjusting vehicle operating parameters may include one or more of adjusting open-loop throttle position, adjusting spark timing, and adjusting one or more threshold(s) for evaporative emissions test diagnostic procedures.

Method 700 will be described with reference to the systems described herein and as shown in FIGS. 1-4B, though it should be understood that similar methods may be applied to other systems without departing from the scope of this disclosure. Method 700 may be carried out by a controller, such as controller 212 in FIG. 2, and may be stored at the controller as executable instructions in non-transitory memory. Instructions for carrying out method 700 and the rest of the methods included herein may be executed by the controller based on instructions stored on a memory of the controller and in conjunction with signals received from sensors of the engine system, such as the sensors described above with reference to FIG. 1 and FIG. 2. The controller may employ vehicle system actuators, such as canister purge valve (CPV) (e.g., 261), fuel tank isolation valve (FTIV) (e.g., 252), fuel injectors (e.g., 266), and ELCM changeover valve (COV) (e.g., 315), etc., according to the method below.

Method 700 begins at 705 and may include monitoring tire pressure (TP) during vehicle operation subsequent to the determination (at FIG. 6) that the BP sensor (e.g., 213) is not functioning as desired. For example, one or more tire pressure sensors (e.g., 197) may be used to monitor TP. The pressure sensors may be typically used in the vehicle to provide an indication to a vehicle operator of TP in the tires so that the vehicle operator may be alerted if pressure in the tires becomes too low so that air may be added to the tires. For example, if the TP in a tire becomes too low then an indication may be sent to a display in the vehicle to alert the vehicle operator. In the context of method 700, tire pressure sensors may be additionally utilized to infer barometric pressure (BP) due to altitude changes in the vehicle. For example, TP may increase responsive to increasing altitude, and may decrease responsive to decreasing altitude, thus providing an indication of BP. More specifically, when a vehicle begins being propelled, tire pressure may initially increase due to friction between the tires and the ground surface. After a duration of time, tire pressure may stabilize during vehicle operation. If, while tire pressure has stabilized, tire pressure again is indicated to increase or decrease greater than a predetermined threshold amount, it may be determined that the altitude of the vehicle has changed, thus providing an indication of a change in BP. In some examples, tire pressure may change more rapidly than may be expected due to a change in altitude, for example if the tires are exposed to cold water, or responsive to one or more tire(s) becoming depleted of air. Thus, if TP change is indicated to increase or decrease greater than the predetermined threshold, but at a rate lower than a predetermined threshold rate, it may be determined that the vehicle altitude has changed, and the TP change may be correlated with a BP change.

Proceeding to 710, method 700 may include indicating whether the engine is operating during the vehicle operation. For example, as described above with regard to FIG. 6, in some examples, a vehicle may be propelled solely by energy from the onboard energy storage device (e.g., 150). However, certain driving conditions may result in the engine being activated. In the event that the engine is activated during vehicle operation, engine operational strategies (e.g., air/fuel ratio estimates and spark timing) may benefit from an accurate estimate of barometric pressure. Accordingly, in a case where the BP sensor (e.g., 213) is not functioning as desired, BP may be inferred from TP. Thus, at 710, if engine operation is not indicated, method 700 may proceed to 715. At 715, method 700 may include maintaining engine-off vehicle operating conditions. For example, if the vehicle is being propelled solely by the onboard energy storage device (e.g., 150), then such vehicle operation may be maintained.

If, at 710, engine operation is indicated, method 700 may proceed to 720. At 720, method 700 may include indicating whether TP change is greater than the predetermined threshold amount. As described above, the TP change may comprise TP change subsequent to an indication that TP has stabilized during vehicle operation. The TP change may also comprise a TP rate of change that is not greater than the predetermined TP threshold change rate. Accordingly, if, at 720 it is indicated that TP has not increased or decreased greater than the predetermined threshold amount, method 700 may proceed to 725. At 725, method 700 may include adjusting vehicle operating conditions based on the reference vacuum (RV) level determined at FIG. 6. As described above, the RV level achieved by activating an ELCM pump (e.g., 330) to draw vacuum across an ELCM reference orifice (e.g., 340) may be linearly correlated with BP, wherein BP may be determined based on the RV level. As such, if TP is not indicated to have changed greater than the predetermined threshold, then it may be determined that BP has not changed since the RV level was determined at the vehicle start-up (described at FIG. 6). Thus, vehicle operating conditions may be thus adjusted based on the BP determined from the RV level measurement. For example, adjusting vehicle operating conditions may include adjusting an open-loop commanded throttle position based on the BP determined from the RV level measurement at 730, and may further include adjusting spark timing at 735. More specifically, responsive to an indicated absence of increase/decrease in BP, the open-loop commanded throttle position may be adjusted based on the BP indicated from the RV level. In another example, spark timing may be adjusted as a function of BP indicated from the RV level. In still another example, if the vehicle is equipped with exhaust gas recirculation (EGR), adjusting vehicle operating conditions at 725 may include updating an EGR schedule. For example if the vehicle is configured with one or more cylinders that may route exhaust gas back to the intake manifold in order to provide a desired dilution, then an amount of exhaust gas recirculated to the intake manifold may be based on the BP pressure indicated from the RV level.

In a still further example, at 725, method 700 may include adjusting evaporative emissions test diagnostic thresholds. For example, as discussed above with regard to FIG. 6, some evaporative emissions test diagnostic procedures may occur during engine-on conditions, wherein engine intake manifold vacuum is utilized to evacuate the vehicle fuel system (e.g. 218) and/or evaporative emissions control system (e.g., 251). An amount of vacuum drawn on the fuel system and/or evaporative emissions system may be adjusted as a function of BP, for example. More specifically, a threshold amount of vacuum drawn on the fuel system and/or evaporative emissions system may decrease as a function of decreasing BP, and increase as a function of increasing BP. Furthermore, responsive to the threshold vacuum being reached during evacuating the fuel system and/or evaporative emissions system, the system(s) may be sealed from atmosphere and from engine intake (discussed above with regard to step 655 of FIG. 6), and pressure bleed-up monitored. As such, predetermined pressure threshold(s), or pressure rate thresholds indicating the presence or absence of undesired evaporative emissions may decrease as a function of decreasing BP, and increase as a function of increasing BP. Accordingly, at 740, because a change in BP was not indicated subsequent to the indication of RV level (at FIG. 6), then evaporative emissions test diagnostic thresholds may be updated to reflect the BP pressure determined as a function of the RV level, as discussed above.

Proceeding to 743, method 700 may include indicating whether a vehicle-off condition is indicated. Such a vehicle-off condition may include a key-off event, or any other event wherein the vehicle goes from being in operation, to being turned off. If a vehicle-off event is indicated, method 700 may then end. Alternatively, if a vehicle-off event is not indicated, method 700 may return to the start of method 700.

Returning to 720, if it is indicated that TP change is greater than the predetermined threshold amount, method 700 may proceed to 745. At 745, method 700 may include adjusting vehicle operating conditions based on TP change. In other words, because the BP sensor (e.g., 213) is indicated to not be functioning as desired (at FIG. 6), and based on the monitoring of TP during vehicle operation it is determined that an altitude change has occurred (BP change), the vehicle operating conditions may be adjusted based on a BP measurement inferred from the TP change.

For example, method 700 may include adjusting an open loop commanded throttle position to compensate for the BP change at 750 and may additionally or alternatively include adjusting a spark timing at 755. More specifically, responsive to an increase BP, the BP increase indicated responsive to an indicated decrease in TP, open loop commanded throttle position may be adjusted (e.g., toward a more closed position) to compensate for the BP change.

Alternatively, responsive to a decrease in BP, open loop commanded throttle position may be adjusted (e.g., toward a more open position) to compensate for the BP change. Furthermore, in another example, a more aggressive spark timing may be employed in response to a decrease in altitude (indicated increase in BP), whereas a less aggressive spark timing may be employed in response to an increase in altitude (indicated decrease in BP). In still further examples, as discussed above, if the vehicle is configured to with one or more cylinders that may route exhaust gas back to the intake manifold to provide a desired dilution, then responsive to an increase in BP an amount of exhaust gas recirculated to intake may be increased in order to provide the desired dilution, while responsive to a decrease in BP an amount of exhaust gas recirculated to intake may be decreased to provide the desired dilution.

In a still further example, at 760, method 700 may include adjusting evaporative emissions test diagnostic thresholds, as discussed above. For example, an amount of vacuum drawn on the fuel system and/or evaporative emissions system during an engine-on evaporative emissions test diagnostic may be adjusted as a function of BP, the BP inferred based on the TP change. More specifically, a threshold amount of vacuum drawn on the fuel system and/or evaporative emissions system may decrease as a function of decreasing BP, and increase as a function of increasing BP. Furthermore, as discussed above, responsive to the threshold vacuum being reached during evacuating the fuel system and/or evaporative emissions system, the system(s) may be sealed from atmosphere and from engine intake (discussed above with regard to step 655 of FIG. 6), and pressure bleed-up monitored. As such, predetermined pressure threshold(s), or pressure rate thresholds indicating the presence or absence of undesired evaporative emissions may decrease as a function of decreasing BP, and increase as a function of increasing BP, the BP inferred based on TP. Accordingly, at 760, because BP has been indicated to have changed subsequent to the BP indication based on RV level (at FIG. 6), evaporative emissions test diagnostic thresholds may be updated/adjusted based on the BP inferred from the change in TP. In some examples, if the indicated change in BP as inferred from the change in TP is greater than a predetermined threshold, method 700 may include aborting any evaporative emissions test diagnostic procedures in progress, as the results of such procedures may be unreliable responsive to the rapid increase/decrease in BP, as inferred from the change in TP.

While not explicitly illustrated in FIG. 7, at 745, method 700 may in some examples include automatically adjusting tire pressure responsive to an indicated tire pressure change, where the tire pressure change is a function of a change in altitude of the vehicle. For example, as discussed above with regard to FIG. 1, in some examples the vehicle may include a pneumatic control unit (e.g., 123) that may receive information regarding tire pressure from tire pressure sensor(s) (e.g., 197), wherein said tire pressure information is sent to the vehicle control system (e.g., 190). Based on said tire pressure information, the control system may command pneumatic control unit 123 to inflate or deflate tire(s) (e.g., 131). By inflating or deflating said tires to an optimal tire rating responsive to an indicated tire pressure change, lifetime of the tire(s) may be prolonged.

In such an example where tire pressure may be automatically controlled by a pneumatic control system unit (e.g., 123) responsive to indications of tire pressure change, control system 190 may store information regarding tire pressure change(s), inferred barometric pressure change, and corresponding amounts of tire inflation or deflation, in order to maintain an ability to correctly infer barometric pressure changes based on subsequent tire pressure change(s). For example, a first tire pressure change of a specific amount may be interpreted (inferred) by the controller as a barometric pressure change of a determined amount. The inferred barometric pressure may be stored at the controller, and tire pressure adjusted based on the indicated tire pressure change via the pneumatic control unit system (e.g., 123). With tire pressure adjusted, further tire pressure change may thus be interpreted by the controller as a function of the stored barometric pressure, inferred from the first tire pressure change of the specific amount. In this way, barometric pressure may be accurately inferred even under circumstances wherein tire pressure is actively adjusted based on indicated tire pressure change(s), wherein tire pressure change(s) are a function of altitude.

Continuing to 743, method 700 may include indicating whether a vehicle-off condition is indicated. If a vehicle-off condition is indicated, method 700 may end. Alternatively, if a vehicle-off event is not indicated, method 700 may return to the start of FIG. 7.

FIG. 8 shows an example timeline 800 for conducting an ELCM-based barometric pressure measurement in order to rationalize an onboard barometric pressure sensor, according to the methods described herein and with reference to FIGS. 6-7, and as applied to the systems described herein and with reference to FIGS. 1-4B. Timeline 800 includes plot 805, indicating whether a vehicle key-on event is indicated (yes) or not (no), and plot 810, indicating whether an engine-on event is indicated (yes) or not (no), over time. Timeline 800 further includes plot 815, indication a position of an air intake throttle (e.g., 262), over time. Timeline 800 further includes plot 820, indicating a barometric pressure as monitored by a barometric pressure sensor (e.g., 213), over time. Timeline 800 further includes plot 825, indicating whether an ELCM pump (e.g., 330), is on or off, over time, and plot 830, indicating whether an ELCM changeover valve (COV) (e.g., 315) is on (e.g., second position), or off (e.g., first position), over time. Timeline 800 further includes plot 835, indicating a pressure as monitored by an ELCM pressure sensor (e.g., 296), over time. Line 836 represents a reference vacuum level, the reference vacuum level corresponding to an inferred barometric pressure, as described above and as will be described in further detail below. Timeline 800 further includes plot 840, indicating a tire pressure (TP), as monitored by one or more tire pressure sensor(s) (e.g., 197), over time. Line 841 represents a first threshold TP, and line 842 represents a second threshold TP. Timeline 800 further includes plot 845, indicating whether the BP sensor (e.g., 213) is functional, over time.

At time t0, the vehicle is not in operation, as a key-on event is not indicated, illustrated by plot 805, and the engine is off, illustrate by plot 810. Throttle position is in a default vehicle-off state, illustrated by plot 815. The ELCM pump (e.g., 330) is off, illustrated by plot 825, and the ELCM COV is off, illustrated by plot 830. As such, with the ELCM pump off and the ELCM COV off (in the first position), the ECLM (e.g. 295) configuration is that depicted in FIG. 3C. Accordingly, pressure as monitored by the ELCM pressure sensor (e.g., 296) is at atmospheric pressure, illustrated by plot 835. Pressure in the tires is at a baseline TP, illustrated by plot 840, where the baseline TP comprises a level of pressure in the tires during vehicle-off conditions wherein the vehicle tires are not experiencing friction (and thus heat) responsive to ground travel, and wherein the TP is further based on environmental conditions. Barometric pressure, as indication by the BP sensor (e.g., 213) is near 30 InHg, indicated by plot 820. Furthermore, a BP rationalization test has not been conducted that has indicated the BP sensor to not be functioning as desired, thus the BP sensor is indicated to be functioning as desired, as illustrated by plot 845.

At time t1 a key-on event is indicated, however an engine-on event is not indicated. As such, it may be understood that the vehicle is operating in an electric-only mode. As the vehicle is operating in an electric-only mode, a BP rationalization procedure may be conducted. Accordingly, at time t2, the ELCM pump is activated (in a first direction) with the ELCM COV maintained in the off (first position) configuration. As discussed, such a condition is depicted above with regard to FIG. 3A. With the ELCM pump activated and the ELCM COV maintained in an off configuration, vacuum may be drawn on an ELCM reference orifice (e.g., 340). Accordingly, between time t2 and t3, pressure as monitored by the ELCM pressure sensor (e.g., 296) becomes negative (vacuum) with respect to atmospheric pressure, and plateaus.

As discussed above responsive to the vacuum (negative pressure with respect to atmosphere) level reaching a plateau, the reference vacuum level may be recorded. The reference vacuum level is represented in timeline 800 by line 836. The reference vacuum level may be stored at the controller, for example. As discussed above, the reference vacuum level may be converted to a BP due to a linear relationship between BP and reference vacuum level achievable by drawing vacuum across the ELCM reference orifice. In one example reference vacuum levels and their corresponding BP may be included in a lookup table stored at the controller, such that reference vacuum level may be converted to an inferred BP by the controller. In this example timeline it may be understood that the reference vacuum level depicted by line 836 represents a BP of 23 InHg. However, the BP sensor (e.g., 213) indicates a BP of ~29 InHg. Thus, at time t3 it is indicated that the BP sensor is not functioning as desired, illustrated by plot 845. Furthermore, at time t3 the ELCM pump is turned off (deactivated), while the ELCM COV is maintained in the off configuration. With the ELCM pump turned off and the ELCM COV in the off configuration, pressure as monitored by the ELCM pressure sensor returns to atmospheric pressure between time t3 and t4.

At time t4, the vehicle begins being propelled. While not explicitly illustrated, it may be understood that the vehicle is being propelled in a forward direction. Accordingly, due to friction between the vehicle tires and the ground surface, TP, as monitored via one or more TP sensor(s) (e.g., 197), rises and plateaus between time t4 and t5. At time t5, the vehicle engine is turned on. For example, the vehicle engine may be activated based on vehicle operator driving conditions. More specifically, while the vehicle was being operated in electric-only mode prior to time t5, at time t5 driving conditions may have changed such that power demand can only be accomplished via engine operation.

As discussed above with regard to FIG. 7, responsive to engine operation during a vehicle drive cycle, engine operational strategies (e.g., air/fuel ratio, spark timing, evaporative emissions test diagnostic thresholds, etc.) may benefit from an accurate estimate of barometric pressure. However, because the BP sensor (e.g., 213) was indicated to not be functioning as desired at time t3, BP may instead be inferred based on TP. Accordingly, responsive to engine operation, TP thresholds may be set, wherein, if TP change is greater than the threshold(s), then it may be indicated that vehicle altitude has changed, and thus, a change in BP may be inferred. Accordingly, both an upper (represented by line 841), and a lower (represented by line 842) TP threshold may be set. If the upper TP threshold is reached or exceeded, then it may be determined that the vehicle has increased in altitude, whereas if the lower TP threshold is reached or exceeded, then it may be determined that the vehicle has decreased in altitude. Moreover, the extent of TP change may be linearly correlated with BP change, similarly to the relationship discussed above with respect to reference vacuum level and BP. For example, another lookup table may be stored at the controller, wherein TP change magnitude may be correlated with BP change, such that an accurate estimation of BP may be determined based on the TP change.

Between time t5 and t6, while the engine is in operation, driver demand fluctuates, as indicated by the throttle changing position to accommodate increased/decreased air intake to the engine. However, TP remains plateaued within the boundaries of the upper (e.g., 841) and lower (e.g., 842) thresholds. Accordingly, a BP change is not indicated, and thus, engine operational strategies may be based on the BP inferred from the reference vacuum level, as discussed above. In the event that a BP change was indicated based on TP change, then engine operational strategies may be adjusted based on the BP inferred by the TP change, as discussed above. Furthermore, between time t5 and t6, the BP sensor (e.g., 213) is indicated to not change, even though throttle position fluctuates. As such, the BP sensor may be stuck, and not responding to pressure changes.

At time t6, the vehicle comes to a stop, and at time t7, a key-off event is indicated. As such, the engine is deactivated (e.g., stopped rotating and combusting fuel). Between time t7 and t8, with the vehicle off, TP begins to decline, illustrated by plot 840.

While the BP rationalization procedure discussed herein with regard to method 600 takes place at a key-on event where an engine of the vehicle is in an off state, such a method is not meant to be limiting in any way. For example, an inferred BP measurement utilizing the ELCM pump (or any other onboard pump for which a reference vacuum may be drawn across a reference orifice) may be conducted at any time during vehicle operation, or if a vehicle is parked, wherein the inferred BP measurement may be compared to a last recorded BP sensor measurement.

In this way, a BP may be inferred based on a reference vacuum level achieved by an ELCM pump, or any other pump wherein a reference vacuum may be drawn across a reference orifice such that an indication of BP may be generated. By inferring BP using a pump, other BP sensor(s) in the vehicle may be rationalized. By enabling vehicle BP sensor(s) to be rationalized, engine operation may be improved, as engine strategies may benefit from an accurate estimate of barometric pressure.

The technical effect is to recognize that when a constant flow pump is utilized to evacuate a small volume with a fixed diameter reference orifice, the pump efficiency will vary as a function of altitude. As such, depending on the level of vacuum achieved during evacuating the small volume with the reference orifice, a BP may be inferred. Such an inference of BP may thus be utilized to rationalize other BP sensor(s) in the vehicle, and if the other BP sensor(s) are found to not be functioning as desired, BP as inferred by the ELCM-based BP measurement may be used to adjust vehicle operating conditions, such as engine operation, and thresholds for evaporative emissions test diagnostic procedures. A further technical effect is the ability to rationalize vehicle BP sensors without the use of engine operation, which may be particularly useful in hybrid electric vehicles, and plug-in hybrid electric vehicles, for example. A still further technical effect is to utilize tire pressure (TP) during vehicle operation in order to infer BP responsive to an indication that a BP sensor is not functioning as desired. By utilizing TP to infer BP responsive to an indication that a BP sensor is not functioning as desired, pump lifetime may be extended as the pump does not have to be used regularly to infer BP responsive to an indication that a BP sensor is not functioning as desired. By rationalizing BP using an onboard pump such as the ELCM pump, and by further inferring BP based on the ELCM pump and in some examples TP, engine operation and other vehicle diagnostics such as evaporative emissions test diagnostic procedures, which rely on accurate BP measurement, may be improved.

The systems described herein and with reference to FIGS. 1-4B, along with the methods described here and with reference to FIGS. 6-7, may enable one or more systems and one or more methods. In one example, a method comprises delivering fuel from a fuel system to an engine propelling a vehicle; storing fuel vapors from the fuel system in an evaporative emissions control system; determining an estimate of barometric pressure as a function of an efficiency of a vacuum pump configured to evacuate or pressurize the fuel system and evaporative emissions control system; and adjusting a vehicle operating parameter responsive to the estimate. In a first example of the method, the method further comprises turning on the vacuum pump and drawing a vacuum across a reference orifice of fixed diameter. A second example of the method optionally includes the first example and further includes wherein drawing the vacuum across the reference orifice of fixed diameter includes configuring a changeover valve coupled to the vacuum pump in a first position; and wherein pressurizing or evacuating the vehicle fuel system and evaporative emissions control system includes configuring the changeover valve in a second position. A third example of the method optionally includes any one or more or each of the first and second examples and further includes wherein the efficiency of the vacuum pump is a function of a vacuum level achieved by the vacuum pump when drawing the vacuum across the reference orifice of fixed diameter. A fourth example of the method optionally includes any one or more or each of the first through third examples and further includes wherein efficiency of the vacuum pump decreases as barometric pressure decreases; and wherein the efficiency of the vacuum pump increases as barometric pressure increases. A fifth example of the method optionally includes any one or more or each of the first through fourth examples and further comprises correlating barometric pressure determined as the function of the efficiency of the vacuum pump with barometric pressure determined from one or more sensor(s) in the vehicle. A sixth example of the method optionally includes any one or more or each of the first through fifth examples and further comprises indicating the one or more sensor(s) in the vehicle are not functioning as desired responsive to a lack of correlation between barometric pressure determined as the function of the efficiency of the vacuum pump and barometric pressure determined from the one or more sensor(s) in the vehicle. A seventh example of the method optionally includes any one or more or each of the first through sixth examples and further includes wherein the one or more sensor(s) in the vehicle include a manifold absolute pressure sensor coupled to an air intake manifold of the engine. An eighth example of the method optionally includes any one or more or each of the first through seventh examples and further includes wherein adjusting a vehicle operating parameter responsive to the estimate includes adjusting an open-loop throttle position of a throttle coupled to an air intake manifold of the engine to a more closed position responsive to an increase in barometric pressure, and adjusting the open-loop throttle position to a more open position responsive to a decrease in barometric pressure. A ninth example of the method optionally includes any one or more or each of the first through eighth examples and further includes wherein adjusting a vehicle operating parameter responsive to the estimate includes adjusting timing of a spark provided to one or more engine cylinder(s); wherein adjusting timing of the spark includes more aggressive spark timing responsive to barometric pressure increase, and less aggressive spark timing responsive to barometric pressure decrease. A tenth example of the method optionally includes any one or more or each of the first through ninth examples and further includes wherein adjusting a vehicle operating parameter responsive to the estimate further comprises adjusting an evaporative emissions test diagnostic threshold. An eleventh example of the method optionally includes any one or more or each of the first through tenth examples and further includes wherein the estimate of barometric pressure is determined without operation of the vehicle engine.

Another example of a method comprises indicating barometric pressure via one or more barometric pressure sensor(s) positioned in a vehicle; activating a vacuum pump onboard the vehicle to draw a vacuum across a reference orifice of fixed diameter; determining barometric pressure as a function of a vacuum level reached during activating the onboard vacuum pump; and indicating the one or more vehicle barometric pressure sensor(s) are not functioning as desired responsive to barometric pressure determined as the function of the vacuum level reached during activating the onboard vacuum pump not correlating with barometric pressure indicated via the one or more barometric pressure sensor(s). In a first example of the method, the method further includes wherein the vacuum level reached during activating the onboard vacuum pump to draw the vacuum across the reference orifice is linearly correlated with barometric pressure; wherein as barometric pressure increases, the vacuum level reached during activating the onboard vacuum pump increases; and wherein as barometric pressure decreases, the vacuum level reached during activating the onboard vacuum pump decreases. A second example of the method optionally includes the first example and further comprises responsive to an indication that the one or more vehicle barometric pressure sensor(s) are functioning as desired; adjusting vehicle operating parameters based on barometric pressure indicated from the one or more vehicle barometric pressure sensor(s) during vehicle operation. A third example of the method optionally includes any one or more or each of the first and second examples and further comprises responsive to an indication that the one or more vehicle barometric pressure sensor(s) are not functioning as desired; adjusting the vehicle operating parameters based on the barometric pressure determined as the function of the vacuum level reached during activating the onboard vacuum pump. A fourth example of the method optionally includes any one or more or each of the first through third examples and further includes wherein the adjusting vehicle operating parameters includes one of at least: adjusting an open-loop throttle position of a throttle coupled to an air intake manifold of an engine of the vehicle, adjusting timing of spark provided to one or more cylinders of the engine, and adjusting one or more threshold(s) for an evaporative emissions test diagnostic procedure; where the evaporative emissions test diagnostic procedure includes evacuating a fuel system and/or an evaporative emissions control system of the vehicle, and monitoring a pressure bleed-up subsequent to sealing the fuel system and/or evaporative emissions control system.

An example of a system for a vehicle comprises a fuel system including a fuel tank that supplies fuel to a vehicle engine; an evaporative emissions control system, selectively coupled to the fuel tank via a fuel tank isolation valve, and including a fuel vapor storage canister; an evaporative level check module (ELCM) positioned in a conduit between the fuel vapor storage canister and atmosphere, where the ELCM includes an electrically driven pump, a changeover valve operable between an first and a second position, and a reference orifice; an intake manifold of the vehicle engine; a barometric pressure sensor positioned in the intake manifold of the vehicle engine; and a controller storing instructions in non-transitory memory, that when executed, cause the controller to: while the engine is off; indicate barometric pressure via the barometric pressure sensor positioned in the intake manifold of the vehicle engine; configure the changeover valve in the first position and activate the pump to draw a vacuum across the reference orifice; indicate barometric pressure as a function of vacuum level reached during drawing the vacuum across the reference orifice; and indicate the barometric pressure sensor is functioning as desired responsive to barometric pressure indicated as the function of vacuum level reached during drawing the vacuum across the reference orifice correlating with barometric pressure indicated via the barometric pressure sensor. In a first example, the system further comprises one or more tire pressure monitoring sensor(s) coupled to one or more tires of wheels in the vehicle; wherein the controller further stores instructions in non-transitory memory, that when executed, cause the controller to: responsive to a lack of correlation between barometric pressure indicated as the function of vacuum level during drawing the vacuum across the reference orifice and barometric pressure indicated via the barometric pressure sensor; monitor tire pressure via the one or more tire pressure monitoring sensor(s); and indicate a change in barometric pressure during vehicle operating conditions responsive to a tire pressure change greater than a predetermined tire pressure change threshold. A second example of the system optionally includes the first example and further includes wherein the controller further stores instructions in non-transitory memory, that when executed, cause the controller to: adjust vehicle operating parameters as a function of barometric pressure indicated via the barometric pressure sensor responsive to the indication that the barometric pressure sensor is functioning as desired; adjust vehicle operating parameters as a function of barometric pressure indicated as the function of vacuum level reached during drawing the vacuum across the reference orifice responsive to lack of correlation between barometric pressure indicated via the barometric pressure sensor and barometric pressure indicated as the function of vacuum level reached during drawing vacuum across the reference orifice, and further responsive to tire pressure change less than the predetermined tire pressure change threshold; and adjust vehicle operating parameters as a function of tire pressure responsive to the lack of correlation between barometric pressure indicated via the barometric pressure sensor and barometric pressure indicated as the function of vacuum level reached during drawing vacuum across the reference orifice, and further responsive to tire pressure change greater than the predetermined tire pressure change threshold; wherein adjusting vehicle operating parameters includes one or more of adjusting open-loop throttle position, adjusting spark-timing, and adjusting one or more threshold(s) for evaporative emissions test diagnostic procedures.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a plug-in hybrid-electric vehicle, comprising:
   an electric motor configured to drive vehicle wheels
   a fuel system including a fuel tank that supplies fuel to a vehicle engine;
   an evaporative emissions control system, selectively coupled to the fuel tank via a fuel tank isolation valve, and including a fuel vapor storage canister;
   an evaporative level check module (ELCM) positioned in a conduit between the fuel vapor storage canister and atmosphere, where the ELCM includes an electrically driven pump, a changeover valve operable between an first and a second position, and a reference orifice;
   an intake manifold of the vehicle engine;
   a barometric pressure sensor positioned in the intake manifold of the vehicle engine; and
   a controller storing instructions in non-transitory memory, that when executed, cause the controller to:
   while the engine is off;
   indicate barometric pressure via the barometric pressure sensor positioned in the intake manifold of the vehicle engine;
   configure the changeover valve in the first position and activate the pump to draw a vacuum across the reference orifice;
   indicate barometric pressure as a function of vacuum level reached during drawing the vacuum across the reference orifice; and
   indicate the barometric pressure sensor is functioning as desired responsive to barometric pressure indicated as the function of vacuum level reached during drawing the vacuum across the reference orifice correlating with barometric pressure indicated via the barometric pressure sensor, wherein the instructions for indicating barometric pressure are carried out without the operating of the engine.

2. The system of claim 1, further comprising:
   one or more tire pressure monitoring sensor(s) coupled to one or more tires of wheels in the vehicle;
   wherein the controller further stores instructions in non-transitory memory, that when executed, cause the controller to:
   responsive to a lack of correlation between barometric pressure indicated as the function of vacuum level during drawing the vacuum across the reference orifice and barometric pressure indicated via the barometric pressure sensor;
   monitor tire pressure via the one or more tire pressure monitoring sensor(s); and
   indicate a change in barometric pressure during vehicle operating conditions responsive to a tire pressure change greater than a predetermined tire pressure change threshold.

3. The system of claim 2, wherein the controller further stores instructions in non-transitory memory, that when executed, cause the controller to:
adjust vehicle operating parameters as a function of barometric pressure indicated via the barometric pressure sensor responsive to the indication that the barometric pressure sensor is functioning as desired;
adjust vehicle operating parameters as a function of barometric pressure indicated as the function of vacuum level reached during drawing the vacuum across the reference orifice responsive to lack of correlation between barometric pressure indicated via the barometric pressure sensor and barometric pressure indicated as the function of vacuum level reached during drawing vacuum across the reference orifice, and further responsive to tire pressure change less than the predetermined tire pressure change threshold; and
adjust vehicle operating parameters as a function of tire pressure responsive to the lack of correlation between barometric pressure indicated via the barometric pressure sensor and barometric pressure indicated as the function of vacuum level reached during drawing vacuum across the reference orifice, and further responsive to tire pressure change greater than the predetermined tire pressure change threshold;
wherein adjusting vehicle operating parameters includes one or more of adjusting open-loop throttle position, adjusting spark-timing, and adjusting one or more threshold(s) for evaporative emissions test diagnostic procedures.

4. A method for operating a hybrid-electric vehicle, comprising:
driving vehicle wheels with an electric motor;
delivering fuel from a fuel system to an engine propelling the vehicle wheels;
storing fuel vapors from the fuel system in an evaporative emissions control system;
determining an estimate of barometric pressure as a function of an efficiency of a vacuum pump configured to evacuate or pressurize the fuel system and evaporative emissions control system; and
adjusting a vehicle operating parameter responsive to the estimate.

5. The method of claim 4, wherein the vehicle is a plug-in hybrid-electric vehicle.

6. The method of claim 4, wherein the fuel system has a fuel cap with a fuel cap locking mechanism configured to automatically lock the fuel cap in a closed position, the fuel cap remaining locked via a refueling lock while pressure or vacuum in a fuel tank of the fuel system is greater than a threshold, the method further comprising, in response to a refuel request by an operator, depressurizing the fuel tank and then unlocking the fuel cap unlocked after the pressure or vacuum in the fuel tank falls.

7. The method of claim 4, further comprising:
turning on the vacuum pump and drawing a vacuum across a reference orifice of fixed diameter, wherein drawing the vacuum across the reference orifice of fixed diameter includes configuring a changeover valve coupled to the vacuum pump in a first position; and
wherein pressurizing or evacuating the vehicle fuel system and evaporative emissions control system includes configuring the changeover valve in a second position.

8. The method of claim 7, wherein the efficiency of the vacuum pump is a function of a vacuum level achieved by the vacuum pump when drawing the vacuum across the reference orifice of fixed diameter.

9. The method of claim 4, wherein efficiency of the vacuum pump decreases as barometric pressure decreases; and wherein
the efficiency of the vacuum pump increases as barometric pressure increases.

10. The method of claim 4, further comprising:
correlating barometric pressure determined as the function of the efficiency of the vacuum pump with barometric pressure determined from one or more sensor(s) in the vehicle, and
indicating the one or more sensor(s) in the vehicle are not functioning as desired responsive to a lack of correlation between barometric pressure determined as the function of the efficiency of the vacuum pump and barometric pressure determined from the one or more sensor(s) in the vehicle.

11. The method of claim 10, wherein the one or more sensor(s) in the vehicle include a manifold absolute pressure sensor coupled to an air intake manifold of the engine.

12. The method of claim 4, wherein adjusting a vehicle operating parameter responsive to the estimate includes adjusting an open-loop throttle position of a throttle coupled to an air intake manifold of the engine to a more closed position responsive to an increase in barometric pressure, and adjusting the open-loop throttle position to a more open position responsive to a decrease in barometric pressure.

13. The method of claim 4, wherein adjusting a vehicle operating parameter responsive to the estimate includes adjusting timing of a spark provided to one or more engine cylinder(s);
wherein adjusting timing of the spark includes more aggressive spark timing responsive to barometric pressure increase, and less aggressive spark timing responsive to barometric pressure decrease.

14. The method of claim 4, wherein adjusting a vehicle operating parameter responsive to the estimate further comprises adjusting an evaporative emissions test diagnostic threshold.

15. The method of claim 4, wherein the estimate of barometric pressure is determined without operation of the vehicle engine but while the vehicle operates in an electric mode.

16. A method of operating a hybrid-electric vehicle, comprising:
driving vehicle wheels with an electric motor via stored electrical energy;
indicating barometric pressure via one or more barometric pressure sensor(s) positioned in the vehicle;
activating a vacuum pump onboard the vehicle to draw a vacuum across a reference orifice of fixed diameter;
determining barometric pressure as a function of a vacuum level reached during activating the onboard vacuum pump; and
indicating the one or more vehicle barometric pressure sensor(s) are not functioning as desired responsive to barometric pressure determined as the function of the vacuum level reached during activating the onboard vacuum pump not correlating with barometric pressure indicated via the one or more barometric pressure sensor(s), wherein the indication of barometric pressure sensor functioning is carried out without the use of engine operation.

17. The method of claim 16, wherein the vacuum level reached during activating the onboard vacuum pump to draw the vacuum across the reference orifice is linearly correlated with barometric pressure;
- wherein as barometric pressure increases, the vacuum level reached during activating the onboard vacuum pump increases; and wherein
- as barometric pressure decreases, the vacuum level reached during activating the onboard vacuum pump decreases.

18. The method of claim 16, further comprising:
- responsive to an indication that the one or more vehicle barometric pressure sensor(s) are functioning as desired;
- adjusting vehicle operating parameters based on barometric pressure indicated from the one or more vehicle barometric pressure sensor(s) during vehicle operation.

19. The method of claim 18, further comprising:
- responsive to an indication that the one or more vehicle barometric pressure sensor(s) are not functioning as desired;
- adjusting the vehicle operating parameters based on the barometric pressure determined as the function of the vacuum level reached during activating the onboard vacuum pump.

20. The method of claim 19, wherein the adjusting vehicle operating parameters includes one of at least:
- adjusting an open-loop throttle position of a throttle coupled to an air intake manifold of an engine of the vehicle, adjusting timing of spark provided to one or more cylinders of the engine, and adjusting one or more threshold(s) for an evaporative emissions test diagnostic procedure;
- where the evaporative emissions test diagnostic procedure includes evacuating a fuel system and/or an evaporative emissions control system of the vehicle, and monitoring a pressure bleed-up subsequent to sealing the fuel system and/or evaporative emissions control system.

* * * * *